United States Patent
Yanagihara et al.

(10) Patent No.: US 12,384,306 B2
(45) Date of Patent: Aug. 12, 2025

(54) SOUND ABSORBER FOR MOTOR VEHICLE AND FLOOR SILENCER FOR MOTOR VEHICLE

(71) Applicant: HOWA CO., LTD., Kasugai (JP)

(72) Inventors: Masahiko Yanagihara, Kasugai (JP); Hiroshi Yamamoto, Kasugai (JP); Kosuke Ueda, Kasugai (JP)

(73) Assignee: HOWA CO., LTD., Kasugai (JP)

( * ) Notice: Subject to any disclaimer, the term of this patent is extended or adjusted under 35 U.S.C. 154(b) by 444 days.

(21) Appl. No.: 17/969,139

(22) Filed: Oct. 19, 2022

(65) Prior Publication Data

US 2023/0132204 A1  Apr. 27, 2023

(30) Foreign Application Priority Data

Oct. 26, 2021  (JP) .................................. 2021-174530

(51) Int. Cl.
*B60R 13/08* (2006.01)
*B62D 25/20* (2006.01)

(52) U.S. Cl.
CPC .............. *B60R 13/08* (2013.01); *B62D 25/20* (2013.01)

(58) Field of Classification Search
CPC ...... B60R 13/08; B62D 25/20; D04H 1/4218; D04H 3/004; D04H 5/12
See application file for complete search history.

(56) References Cited

FOREIGN PATENT DOCUMENTS

| EP | 1097798 A1 | * | 5/2001 | ......... B29B 17/0026 |
|---|---|---|---|---|
| JP | H08-72075 A | | 3/1996 | |
| JP | 2011020355 A | * | 2/2011 | |
| JP | 2021017012 A | * | 2/2021 | |
| WO | WO-0209089 A1 | * | 1/2002 | ........... B29C 43/228 |

OTHER PUBLICATIONS

English translation to JP-2021017012-A to Noda obtained from PE2E database (Year: 2021).*
English abstract to JP-2011020355-A to Kobayashi et al. obtained from PE2E database (Year: 2011).*

* cited by examiner

*Primary Examiner* — Jeremy R Pierce
(74) *Attorney, Agent, or Firm* — Oliff PLC

(57) ABSTRACT

Each mixed main body of a plurality of mixed members is formed from a pulverized raw material of a steric shape, of a plurality of pulverized raw materials obtained by pulverizing a layered composite raw material into various shapes including the steric shape and a linear shape. Each mixed glass fiber portion of the plurality of mixed members is formed by a plurality of glass fibers extending by the pulverization from a portion of the mixed main body corresponding to a glass fiber layer. Each mixed glass fiber portion of the plurality of mixed members is located in a labyrinthine path formed between mixed main bodies facing each other among the plurality of mixed members in a stirred mixture body including the plurality of mixed members stirred and mixed in a binder and the binder.

23 Claims, 15 Drawing Sheets

SOUND ABSORBER FOR MOTOR VEHICLE AND FLOOR SILENCER FOR MOTOR VEHICLE

BACKGROUND OF THE INVENTION

Field of the Invention

The present invention relates to a sound absorber for a motor vehicle and a floor silencer for a motor vehicle, which are suitable for absorbing noisy sounds entering a vehicle compartment of the motor vehicle.

Description of Related Art

In recent years, a wide variety of motor vehicles have been developed, and there has been an increasing trend in the production volume of such motor vehicles. This has led to an increasing trend in the number of motor vehicles to be repaired or scrapped due to accidents or the like. Along with the increasing trend, various parts of the motor vehicles tend to be disposed of as scrap or discarded parts. This means that the recent increasing trend in the number of motor vehicles leads to a huge economic loss due to the parts being scrapped. In view of this, there has been a demand for effective measures for reducing this economic loss.

In order to meet such a demand, it is considered that the scrap parts are recycled. Thus, the recycling of the scrap parts obviously leads to effective reuse of the scrap parts, and may also effectively reduce the economic loss due to the parts being scrapped.

For example, a part on the roof (hereinafter, referred to as a roof part) of a motor vehicle is disposed of as a scrap part, which may lead to a huge economic loss, because the production volume of motor vehicles is large these days. Thus, there has been a demand for recycling the roof part to be disposed of as a scrap part.

Meanwhile, noisy sounds propagate into a vehicle compartment of a motor vehicle when the motor vehicle stops or is traveling. For example, in a motor vehicle equipped with an engine as a prime mover, the engine produces noisy sounds respectively with a frequency in a wide frequency band from a low frequency band to a high frequency band.

In an electric motor vehicle equipped with an electric motor as a prime mover, a plurality of in-vehicle batteries and inverters produce noisy sounds respectively with a frequency in a high frequency band.

Furthermore, regardless of the type of the prime mover, noisy sounds within a low-to-mid frequency band covering the low to mid frequencies are generated from the road, the tires, and the like, while the motor vehicle is traveling.

When such noisy sounds propagate into the vehicle compartment of the motor vehicle, the noisy sounds make an occupant feeling uncomfortable. Thus, there has recently been a strong demand for measures for reducing the noisy sounds.

In view of such a thing, for example, if the roof part to be disposed of as a scrap part as described above can be reused as a noise reduction part, that is, a sound absorbing part, the roof part to be a scrap part may largely contribute to measures for noise reduction and measures for reducing the economic loss described above.

With regard to this, for example, chip urethane manufactured by a chip urethane manufacturing method disclosed in Japanese Unexamined Patent Publication No. 1996-072075 may be used as sound absorbing parts.

According to the manufacturing method of the chip urethane, plural chip material is formed by pulverizing scrap parts of urethane or the like using a pulverizer. Then, a urethane-based binder is mixed with the plural chip material by a mixer. Thereafter, the mixture obtained by mixing in such away is molded by press molding and is thus manufactured as the above-described chip urethane.

By the way, in the above-described manufacturing method of the chip urethane, in case the scrap part is a single urethane layer, the urethane layer cannot exhibit good sound absorption performance for or against noisy sounds.

Thus, if plural chip material obtained by pulverizing the single urethane layer are formed as the above-mentioned chip urethane by being mixed with the binder and stacked, the single urethane layer still cannot exhibit good sound absorbing performance against noisy sounds, as in the case of the single urethane layer. This is the same even if the scrap part is, for example, a layered composite part of a urethane layer and a nonwoven fabric layer.

SUMMARY OF THE INVENTION

It is, therefore, an object of the present invention to provide a sound absorber for a motor vehicle and a floor silencer for a motor vehicle capable of exhibiting excellent sound absorbing performance against noisy sounds or noises by utilizing a layered composite part formed with plural layers including at least one glass fiber layer.

For solving the problem described above, a description will be given on how the inventors of the present invention came to create a sound absorber capable of exhibiting excellent sound absorbing performance against noises respectively having a frequency in a wide frequency band including a low-to-mid frequency band, by utilizing a layered composite part including a glass fiber layer.

As explained in the prior art, even if the scrap part is the chip urethane which is formed by using a single layer part for scrap formed with a single urethane layer or a layered composite part of a urethane layer and a nonwoven fabric layer, as described above, the chip urethane cannot exhibit good sound absorbing performance against noises.

In view of this, various materials generally regarded as being suitable for sound absorption other than urethane and nonwoven fabric were used for a single layer part or a layered composite part. Then, a process was repeated, where the single layer part or the layered composite part was chipped, mixed with the binder, and then formed into a layer to form a layered body such as chip urethane as described above.

In such a process, a roof part was used as the layered composite part described above. The roof part was chipped as described above, mixed with the binder, and dispersedly layered and then solidified, thereby to form a layered body such as chip urethane.

The sound absorbing performance of such a layered body was examined. As a result, it has been found that the layered body may exhibit excellent sound absorbing performance against noises respectively with a frequency at least in a low-to-mid frequency band.

When research was conducted to find out the reason why such a layered body is capable of exhibiting excellent sound absorbing performance against noises respectively with a frequency in the low-to-mid frequency band, it has been found that the reason is mainly due to the glass fiber layer included in the laminated composite part which is the roof part.

More detailed study was performed on this point. In chipping the above-mentioned roof parts, when the roof parts are pulverized, the roof part is dispersedly formed into a plurality of pulverized members including a large pulverized main body of a steric shape and a plurality of small pulverized members of a linear shape or a strip shape. Herein, a plurality of glass fiber portions are formed to extend from the pulverized main body, when the roof part is pulverized. This means that the plurality of pulverized members each include the large pulverized main body of a steric shape and the plurality of glass fiber portions extending from the pulverized main body.

Of the pulverized members dispersedly formed, the pulverized members having the large pulverized main body of a steric shape were dispersedly stirred and mixed with the binder, thereby to form a layered body such as chip urethane.

In the layered body thus formed, paths are respectively formed to pass in a labyrinth between the pulverized main bodies facing each other in the chip urethane, and the plurality of glass fiber portions are dispersedly located in each of the paths.

For examining the sound absorbing performance of the layered body thus formed, noises respectively with a frequency over a wide frequency band were caused to enter the layered body. As a result, it was found that the layered body exhibits excellent sound absorbing performance against noises respectively with a frequency in the low-to-mid frequency band, of the noises described above.

A detailed examination was performed on this point. As a result, it was found that when noises pass through the paths described above along the labyrinthine shape and through the plurality of glass fiber portions, the noises consumed its vibration energy, thereby to give excellent sound absorbing performance to the layered body.

Furthermore, it was found that by adjusting the size of the steric shape of the large pulverized member, the layered body may exhibit excellent sound absorbing performance against noises respectively with a frequency in the low-to-mid frequency band and noises respectively with a frequency in the high frequency band.

Furthermore, it was found that even when a layered body such as chip urethane is formed by chipping a part of a motor vehicle other than the roof part, mixing and stirring the chips of the part with the binder as in the case of the roof part, the layered body is capable of exhibiting excellent sound absorbing performance against noises as described above, as long as the part is a multilayer member including the glass fiber layer.

Thus, the present inventors have come to an idea of forming a sound absorber that can exhibit excellent sound absorbing performance against noises respectively with a frequency in a wide frequency band, by utilizing a layered composite part including a glass fiber layer, among parts of a motor vehicle.

In order to solve the problem described above, the present invention is obtained as follows based on the idea described above.

A sound absorber for a motor vehicle formed in a predetermined layer shape comprises a plurality of mixed members, and a binder.

The plurality of mixed members include respectively a mixed main body and a mixed glass fiber portion.

The mixed main body is formed from a pulverized raw material having a steric shape, of a plurality of pulverized raw materials obtained by pulverizing a layered composite raw material formed by layering a porous layer, a thermosetting resin layer, and a glass fiber layer including a plurality of glass fibers, into various shapes including at least the steric shape and a linear shape, and the mixed glass fiber portion is formed from a plurality of glass fibers extending with the pulverization from a portion of said mixed main body corresponding to said glass fiber layer.

The mixed main body and the mixed glass fiber portion included in each of the plurality of mixed members are dispersedly stirred and mixed in the binder to form a stirred mixture body together with the binder. The stirred mixture body has at least one labyrinthine path formed between a plurality of mixed main bodies facing each other, of the mixed main bodies of the plurality of mixed members, and the mixed glass fiber portion of each of the plurality of mixed members is located in the at least one labyrinthine path.

The sound absorber for a motor vehicle formed in this way is formed by dispersing the plurality of mixed members in the binder. Therefore, in the sound absorber for a motor vehicle, the plurality of mixed members includes the plurality of glass fiber portions extending from the mixed main bodies in the dispersed state in the binder. The at least one labyrinthine path is formed between plural mixed main bodies facing each other, of each mixed main body of the plurality of mixed members, and the plurality of mixed glass fiber portions of each of the plurality of mixed members are located in the at least one labyrinthine path.

Thus, when noises enter the sound absorber for a motor vehicle having a predetermined layer shape from one facing surface of both facing surfaces of the sound absorber, the noises travel inside the sound absorber for a motor vehicle toward the other surface.

Here, the plurality of mixed glass fiber portions of each of the plurality of mixed members are located in the at least one labyrinthine path, as described above. Therefore, when the noises enter the sound absorber for a motor vehicle, as described above, the noises mainly pass through the at least one labyrinthine path.

In this process, the noises travel along the labyrinthine shape of the labyrinthine path. Each glass fiber of the mixed glass fiber portion has elasticity and rigidity of a glass material. Therefore, the noises travel along the labyrinthine shape of the labyrinthine path, while colliding with the glass fibers of the mixed glass fiber portion in the labyrinthine path.

Accordingly, the noises travel while exhausting the vibration energy thereof by vibrating each of the glass fibers under the elasticity and the rigidity of each of the glass fibers and travel along the labyrinthine shape of the at least one labyrinthine path while exhausting the vibration energy thereof.

Thus, the noises are very favorably reduced based on the collision with each of the mixed glass fiber portions and on the labyrinthine shape of the at least one labyrinthine path. This means that the sound absorber for a motor vehicle can exhibit excellent sound absorbing performance under the above configuration thereof.

In another aspect, a sound absorber for a motor vehicle according to the present invention is formed in a predetermined layer shape, as described above.

The sound absorber for a motor vehicle is provided with a plurality of mixed members and a binder.

The plurality of mixed members are respectively provided with a mixed main body and a mixed glass fiber portion.

The above-mentioned mixed main body is formed from a pulverized raw material having a steric shape, of a plurality of pulverized raw materials obtained by pulverizing a layered composite raw material formed by sequentially layering a one-side porous layer, a one-side glass fiber layer including a plurality of glass fibers, a foamed urethane layer, an other-side glass fiber layer including a plurality of glass fibers, and an other-side porous layer, into various shapes including at least the steric shape and a linear shape.

The mixed glass fiber portion is formed from a plurality of glass fibers extending with the pulverization from a portion of the mixed main body corresponding to at least one glass fiber layer of the one-side glass fiber layer and the other-side glass fiber layer.

The mixed main body and the mixed glass fiber portion included in each of the plurality of mixed members are dispersedly stirred and mixed in the binder to form a stirred mixture body together with the binder. The stirred mixture body has at least one labyrinthine path formed between a plurality of mixed main bodies facing each other, of the mixed main bodies of the plurality of mixed members. The mixed glass fiber portion of each of the plurality of mixed members is located in the at least one labyrinthine path.

Even if the layered composite raw is formed by the one-side porous layer, the one-side glass fiber layer including the plurality of glass fibers, the foamed urethane layer, the another-side glass fiber layer including the plurality of glass fibers, and the another-side porous layer sequentially layered in this way, operations and effects that are the same as those of the present invention described above may be more specifically achieved.

According to the present invention, in the sound absorber for a motor vehicle described above, the plurality of mixed members include respectively as the mixed main body any one of a plurality of steric members formed by cutting a layered composite raw material, in which a porous layer, a thermosetting resin layer, and a glass fiber layer including a plurality of glass fibers are layered, into plural steric shapes in a thickness direction at an interval, and include respectively as the mixed glass fiber portions a plurality of glass fibers extending with the cutting from a portion of the any one of the steric members corresponding to the glass fiber layer.

According to the configuration, the operations and effects that are the same as those of the present invention described above may be achieved, even if the mixed main body of each of the plurality of mixed members is formed from any one of the plurality of steric members obtained by cutting the layered composite raw material configured as described above in the thickness direction at an interval into a steric shape, and each of the mixed glass fiber portions is formed from a plurality of glass fibers extending, as a result of the cutting, from the portion of the any one of the steric members described above corresponding to the glass fiber layer.

According to the present invention, the sound absorber described above further comprises a cotton-like fiber member, in addition to the plurality of mixed members and the binder.

The stirred mixture body is formed by dispersedly stirring and mixing the plurality of mixed members and the cotton-like fiber member in the binder, and the cotton-like fiber member is located in the at least one labyrinthine path together with the mixed glass fiber portions of each of the plurality of mixed members.

A mixture ratio A/B, where A represents the plurality of mixed members and B represents the cotton-like fiber member, is set to reduce noises respectively with a frequency in a predetermined frequency band, under cooperation with the at least one labyrinthine path and with the cotton-like fiber member and the mixed glass fiber portions of each of the plurality of mixed members in the at least one labyrinthine path.

With this configuration, the sound absorber for a motor vehicle further includes the cotton-like fiber member based on the mixture ratio, in addition to the plurality of mixed members and the binder. In this case, the number of the mixed member in the sound absorber for a motor vehicle is reduced by an amount corresponding to the volume of the cotton-like fiber member based on the mixture ratio. The cotton-like fiber member is much lighter, compared with the plurality of mixed members.

Therefore, the total weight of the plurality of mixed members used for the sound absorber for a motor vehicle is reduced due to the cotton-like fiber member based on the mixture ratio.

Moreover, the mixture ratio A/B of the plurality of mixed members A to the cotton-like fiber member B is, as described above, set to reduce noises respectively with a frequency in the predetermined frequency band, under cooperation with the at least one labyrinthine path and with the cotton-like fiber member and the mixed glass fiber portions of the plurality of mixed members in the at least one labyrinthine path.

Thus, when noises enter the sound absorber for a motor vehicle from one side surface of the sound absorber, noises respectively with a frequency in the predetermined frequency band, of the noises entering the sound absorber, as described above may be favorably reduced under the above-mentioned mixture ratio by movement along the labyrinthine shape of the at least one labyrinthine path and by exhaustion of the vibration energy due to the collision with the cotton-like fiber member and each of the mixed glass fiber portions in the at least one labyrinthine path. Therefore, the operations and effects of the present invention described above may be further improved. In this way, the sound absorber for a motor vehicle can exhibit excellent sound absorbing performance under the above-mentioned configuration.

According to the present invention, in the sound absorber for a motor vehicle described above, the predetermined frequency band shifts toward a low frequency band side or a high frequency band side in accordance with an increase or decrease of the mixture ratio A/B.

With this configuration, the predetermined frequency band shifts toward the high frequency band side as the mixture ratio A/B decreases. Thus, it is possible to provide a sound absorber for a motor vehicle that can exhibit excellent sound absorbing performance mainly against noises respectively with a frequency in the high frequency.

On the other hand, the predetermined frequency band shifts toward the low frequency band side as the mixture ratio A/B increases. Thus, it is possible to provide a sound absorber for a motor vehicle that can exhibit excellent sound absorbing performance mainly against noises respectively with a frequency in the low-to-mid frequency band.

According to the present invention, in the sound absorber for a motor vehicle described above, the layered composite raw material is formed by a layered composite part for scrapping installed already in a motor vehicle or a layered composite part for a motor vehicle subject to scrap due to poor quality.

With this configuration, the layered composite part for scrapping installed in the motor vehicle or the layered composite part for a motor vehicle subject to scrap due to poor quality can be effectively utilized as a recycled part for manufacturing the sound absorber for a motor vehicle without wasting. As a result, a huge economical effect may be obtained in addition to the operations and effects of the present invention described above.

According to the present invention, in the sound absorber for a motor vehicle described above, as each of the plurality of mixed members as a first mixed member, the plurality of pulverized raw materials of the linear shape, of the plurality of pulverized raw materials is provided as a plurality of second mixed members.

The stirred mixture body is formed by dispersedly stirring and mixing the plurality of first mixed members and the plurality of second mixed members in the binder. The plurality of second mixed members are located in the at least one labyrinthine path together with the mixed glass fiber portions of each of the plurality of first mixed members.

With this configuration, the plurality of second mixed members are located in the at least one labyrinthine path together with the mixed glass fiber portions of each of the plurality of first mixed members. Accordingly, when noises enter the sound absorber for a motor vehicle from one side surface of the sound absorber, the noises may be favorably reduced by movement along the labyrinthine shape of the at least one labyrinthine path and by exhaustion of the vibration energy due to the collision with the plurality of second mixed members and the mixed glass fiber portions in the at least one labyrinthine path. As a result, the operations and effects of the present invention described above may be further improved.

According to the present invention, in the sound absorber for a motor vehicle described above, the porous layer of the layered composite raw material includes porous fibers. The plurality of first mixed members include respectively at its mixed main body a portion corresponding to the porous layer.

The plurality of mixed members are respectively formed such that a mixed porous fiber portion formed by a plurality of porous fibers extends with the pulverization from the portion of the mixed main body corresponding to the porous layer, and the mixed porous fiber portions of each of the plurality of mixed members are located in the labyrinthine path together with the glass fiber portions of each of the plurality of mixed members.

With such configuration, the mixed porous fiber portions of each of the plurality of mixed members are located in the at least one labyrinthine path together with the mixed glass fiber portions of each of the plurality of mixed members.

Accordingly, when noises enter the sound absorber for a motor vehicle from one side surface of the sound absorber, the noises may be favorably reduced by movement along the labyrinthine shape of the at least one labyrinthine path and by exhaustion of the vibration energy due to the collision with the mixed glass fiber portions and the mixed porous fiber portions in the at least one labyrinthine path. As a result, the operations and effects of the present invention described above may be further improved.

According to the present invention, in the sound absorber for a motor vehicle described above, the porous layer of the layered composite raw material includes a plurality of porous fibers, and the plurality of first mixed members have respectively at its mixed main body a portion corresponding to the porous layer.

The plurality of first mixed members are respectively formed so as to extend with the pulverization mixed porous fiber portions, formed by the plurality of porous fibers, from the portion of the mixed main body corresponding to the porous layer, and the mixed porous fiber portions of each of the plurality of first mixed members are located in the at least one labyrinthine path together with the mixed glass fiber portions of each of the plurality of first mixed members and the plurality second mixed members.

With this configuration, the mixed porous fiber portions of each of the plurality of first mixed members are located in the labyrinthine path together with the mixed glass fiber portions of each of the plurality of first mixed members and each of the plurality of second mixed members.

Accordingly, when noises enter the sound absorber for a motor vehicle from one side surface of the sound absorber, the noises may be favorably reduced by movement along the labyrinthine shape of the at least one labyrinthine path and by exhaustion of the vibration energy due to the collision with the mixed glass fiber portions, the mixed porous fiber portions, and the second mixed members in the at least one labyrinthine path. As a result, the operations and effects of the present invention described above may be further improved.

According to the present invention, in the sound absorber for a motor vehicle described above, the larger a size of the mixed main body of each of the plurality of mixed members, the lower an air permeability of the mixed main body is set so as to reduce noises with a frequency in a low-to-mid frequency band, and the smaller the size of the mixed main body, the higher the air permeability of the mixed main body is set so as to reduce noises with a frequency in a high frequency band.

With this configuration, the larger each of the mixed bodies, the lower the air permeability of each of the mixed bodies so as to reduce noises respectively with a frequency in the low-to-mid frequency band. Furthermore, the smaller each of the mixed bodies, the higher the air permeability of each of the mixed bodies so as to reduce noises respectively with a frequency in the high frequency band. Thus, with adjustment of the air permeability by changing the sizes of each of the mixed main bodies, it is possible to provide a sound absorber for a motor vehicle that can exhibit excellent sound absorbing performance against noises respectively with a frequency in the low-to-mid frequency band and the high frequency band.

According to the present invention, a floor silencer for a motor vehicle equipped with at least one of an electric motor and an engine as a prime mover is formed in a predetermined layer shape and installed along a floor wall of a vehicle compartment of the motor vehicle from an inner side of the vehicle compartment.

The floor silencer comprises a plurality of mixed members, and a binder. The plurality of mixed members include respectively a mixed main body and a mixed glass fiber portion.

The mixed main body is formed from a pulverized raw material having a steric shape, of a plurality of pulverized raw materials obtained by pulverizing a layered composite raw material formed by layering a porous layer, a thermosetting resin layer, and a glass fiber layer including a plurality of glass fibers, into various shapes including at least the steric shape and a linear shape. The mixed glass fiber portion is formed from a plurality of glass fibers extending with the pulverization from a portion of the mixed main body corresponding to the glass fiber layer.

The mixed main body and the mixed glass fiber portion included in each of the plurality of mixed members are dispersedly stirred and mixed in the binder to form a stirred mixture body together with the binder. The stirred mixture body has at least one labyrinthine path formed between each of a plurality of mixed main bodies facing each other, of the mixed main bodies of the plurality of mixed members, and the plurality of mixed members are located at the mixed glass fiber portion thereof in the at least one labyrinthine path.

With this configuration, it is possible to provide a floor silencer for a motor vehicle such as an electric motor vehicle, a gasoline motor vehicle, a hybrid motor vehicle, or the like that may achieve the operations and effects of the sound absorber for a motor vehicle according to the present invention described above.

According to the present invention, the floor silencer described above further comprises a cotton-like fiber member in addition to the plurality of mixed members and said binder.

The stirred mixture body is formed by dispersedly stirring and mixing the plurality of mixed members and the cotton-like fiber member in the binder, and the cotton-like fiber member is located in the at least one labyrinthine path together with the mixed glass fiber portions of each of the plurality of mixed members.

A mixture ratio A/B, where A represents the plurality of mixed members and B represents the cotton-like fiber member, is set to reduce noises respectively with a frequency in a predetermined frequency band, under cooperation with the at least one labyrinthine path and with the cotton-like fiber member and the mixed glass fiber portions of each of the plurality of mixed members in the at least one labyrinthine path.

Accordingly, it is possible to provide a floor silencer for a motor vehicle such as an electric motor vehicle, a gasoline motor vehicle, a hybrid motor vehicle, or the like that may achieve the operations and effects of the sound absorber for a motor vehicle according to the present invention including the cotton-like fiber member, in addition to the plurality of mixed members and the binder described above, while achieving the same operations and effects as those of the floor silencer for a motor vehicle according to the present invention described above.

According to the present invention, in the floor silencer for a motor vehicle described above, the predetermined frequency band shifts toward a low frequency band side or a high frequency band side, in accordance with an increase or decrease of the mixture ratio A/B.

With this configuration, it is possible to provide a floor silencer for a motor vehicle such as an electric motor vehicle, a gasoline motor vehicle, a hybrid motor vehicle, or the like that may achieve the operations and effects of the sound absorber according to the present invention, in which the predetermined frequency band described above is set to be shifted toward the low frequency band side or the high frequency band side in accordance with an increase or decrease of the mixture ratio A/B, while achieving the same operations and effects as those of the floor silencer for a motor vehicle according to the present invention including the cotton-like fiber member in addition to the plurality of mixed members and the binder as described above.

According to the present invention, in the floor silencer for a motor vehicle described above, the layered composite raw material includes a layered composite part for scrapping installed already in a motor vehicle or a layered composite part for a motor vehicle subject to scrap due to poor quality.

Accordingly, it is possible to provide a floor silencer for a motor vehicle such as an electric motor vehicle, a gasoline motor vehicle, a hybrid motor vehicle, or the like that may achieve the operations and effects of the sound absorber for a motor vehicle according to the present invention, in which the layered composite raw material is formed by the layered composite part installed in the motor vehicle or the layered composite part for a motor vehicle subject to scrap due to poor quality, while achieving the same operations and effects as those of the floor silencer for a motor vehicle according to the present invention described above.

According to the present invention, in the floor silencer for a motor vehicle described above, with each of the plurality of mixed members is provided as a first mixed member, the plurality of pulverized raw materials of the above-mentioned linear shape, of the plurality of pulverized raw materials are provided as a plurality of second mixed members.

The stirred mixture body is formed by dispersedly stirring and mixing the plurality of first mixed members and the plurality of second mixed members in the binder, and the plurality of second mixed members are located in the at least one labyrinthine path together with the mixed glass fiber portions of each of the plurality of first mixed members.

According to such a configuration, it is possible to provide a floor silencer such as an electric motor vehicle, a gasoline motor vehicle, a hybrid motor vehicle, or the like that may achieve the operations and effects of the sound absorber for a motor vehicle according to the present invention which is provided with each of the plurality of mixed members as the first mixed member and with the plurality of pulverized raw materials having respectively the linear shape, of the plurality of pulverized raw materials, as the plurality of second mixed members, while achieving the same operations and effects as those of the automotive floor silencer according to the present invention described above.

According to the present invention, in the floor silencer for a motor vehicle described above, the porous layer of the layered composite raw material includes a plurality of porous fibers, and the plurality of mixed members have respectively at its mixed main body a portion corresponding to the porous layer.

The plurality of mixed members are respectively formed such that a mixed porous fiber portion formed by a plurality of porous fibers extends with the pulverization from the portion of the mixed main body corresponding to the porous layer, and the mixed porous fiber portions of each of the plurality of mixed members are located in the at least one labyrinthine path together with the glass fiber portions of each of the plurality of mixed members.

With this configuration, it is possible to provide a floor silencer for a motor vehicle such as an electric motor vehicle, a gasoline motor vehicle, a hybrid motor vehicle, or the like that may achieve the operations and effects of the sound absorber for a motor vehicle according to the present invention, in which the porous layer of the layered composite raw material includes the plurality of porous fibers as described above, while achieving the same operations and effects as those of the floor silencer for a motor vehicle according to the present invention described above.

According to the present invention, in the floor silencer for a motor vehicle described above, the porous layer of the layered composite raw material includes a plurality of porous fibers, and the mixed main body of each of the plurality of mixed members have a portion corresponding to the porous layer.

Each of the plurality of mixed members is formed such that a mixed porous fiber portion formed by a plurality of porous fibers extends with the pulverization from the portion of the mixed main body corresponding to the porous layer, and the mixed porous fiber portions of each of the plurality of mixed members are located in the at least one labyrinthine path together with the glass fiber portions of each of the plurality of mixed members and the plurality of mixed members.

According to this configuration, it is possible to provide a floor silencer for a motor vehicle such as an electric motor vehicle, a gasoline motor vehicle, a hybrid motor vehicle, or the like that may achieve the operations and effects of the sound absorber for a motor vehicle according to the present invention in which the plurality of mixed members are respectively located at its mixed porous fiber portion in at least one of the plural labyrinthine paths together with the glass fiber portions of the plurality of mixed members and the plurality of mixed members as described above, while achieving the same operations and effects as those of the automotive floor silencer according to the present invention described above.

According to the present invention, in the floor silencer described above, the larger a size of the mixed main body of each of the plurality of mixed members, the lower an air permeability of the mixed main body is set so as to reduce noises respectively with a frequency in a low-to-mid frequency band, and the smaller the size of the mixed main body, the higher the air permeability of the mixed main body is set so as to reduce noises respectively with a frequency in a high frequency band.

With this configuration, it is possible to provide a floor silencer for a motor vehicle such as an electric motor vehicle, a gasoline motor vehicle, a hybrid motor vehicle, or the like that may achieve the operations and effects of the sound absorber for a motor vehicle according to the present invention in which the larger the size of the mixing body of each of the plurality of mixing member, the lower the air permeability of the mixing body is set to reduce noises respectively with a frequency in a low-to-mid frequency band, and the smaller the size of the mixed main body, the higher the air permeability of the mixed main body is to reduce noises respectively with a frequency in a high frequency band, as described above, while achieving the same operations and effects as those of the automotive floor silencer according to the present invention described above.

According to the present invention, the floor silencer for a motor vehicle described above, the motor vehicle is provided with an engine of at least one of the electric motor and the engine as the prime mover.

A size of the mixed main body of each of the plurality of mixed members is set to reduce noises respectively with a frequency in a low-to-mid frequency range.

With this configuration, it is possible to provide a floor silencer for a motor vehicle that may exhibit excellent sound absorbing performance against noises respectively with a frequency in the low-to-mid frequency band, among noises generated from the engine, while achieving the same operations and effects as those of the floor silencer for a motor vehicle according to the present invention.

According to the present invention, the floor silencer for a motor vehicle described above comprises the electric motor of at least one of the electric motor and the engine as the prime mover, and a battery set disposed along a lower surface of the floor wall and including a battery group supplying electric power to the prime mover.

A size of the mixed main body of each of the plurality of mixed members is set to reduce noises respectively with a frequency in a low-to-mid frequency range and a high frequency range.

With this configuration, it is possible to provide a floor silencer for a motor vehicle capable of exhibiting excellent sound absorbing performance against noises respectively with a frequency in the low-to-mid frequency range and the high frequency range, in other words, noises respectively with a frequency in the low-to-mid frequency range produced from the road and noises respectively with a frequency in the high frequency range generated from the battery group, while achieving the same operations and effects as those of the floor silencer for a motor vehicle according to the invention described above.

BRIEF DESCRIPTION OF THE DRAWINGS

Other features and advantages of the invention will be apparent from the following description taken in connection with the accompanying drawings.

DETAILED DESCRIPTION OF THE PREFERRED EMBODIMENTS

Hereinafter, each of embodiments of the present invention will be described below with reference to the drawings.

First Embodiment

Figure 1:
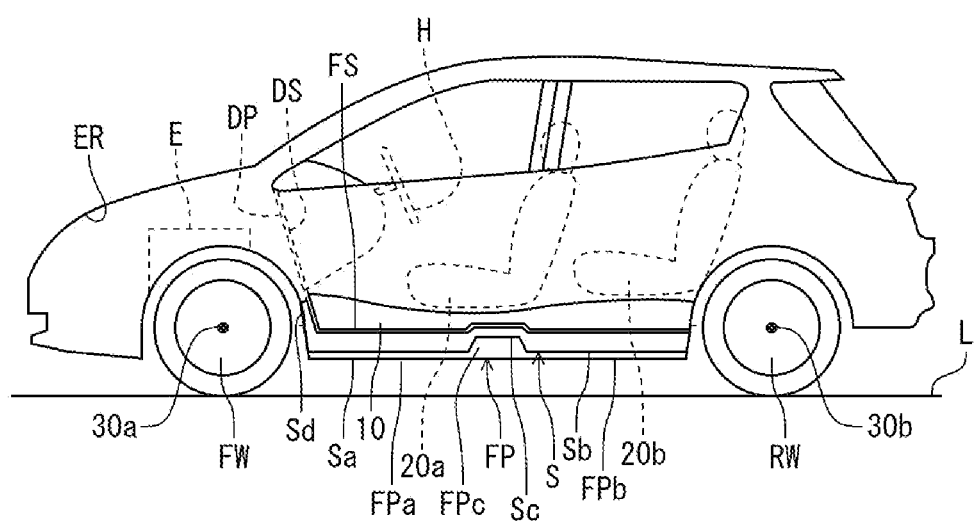
FIG. 1 is a partially cutaway schematic side view of a motor vehicle to which a first embodiment of a floor silencer for the motor vehicle according to the present invention is applied.

FIG. 1 illustrates a first embodiment of the present invention applied to a motor vehicle. The motor vehicle is one type of motor vehicles that use gasoline as fuel. Hereinafter, the one type of motor vehicles is referred to as a gasoline motor vehicle. The gasoline motor vehicle has an engine E installed therein.

The engine E is installed in an engine room ER (see FIG. 1) of the gasoline motor vehicle.

The gasoline motor vehicle includes a vehicle compartment 10. The vehicle compartment 10 is formed in the gasoline motor vehicle so as to be positioned behind the engine room ER through a dash panel DP.

The gasoline motor vehicle includes left and right front seats 20a (only the left front seat 20a is illustrated in FIG. 1) and left and right back seats 20b (only the left back seat 20b is illustrated in FIG. 1) disposed in the vehicle compartment 10. Additionally, in FIG. 1, a reference numeral H denotes a steering wheel, a reference numeral FP denotes a floor panel of the gasoline motor vehicle, and a reference numeral FS denotes a floor sheet.

The gasoline motor vehicle also includes left and right front wheels FW and left and right rear wheels RW. The left and right front wheels FW are supported by left and right end portions of a front axle 30a, and the left and right rear wheels RW are supported by left and right end portions of a rear axle 30b.

As illustrated in FIG. 1, the gasoline motor vehicle includes a floor silencer S according to the present invention. In the first embodiment, the floor silencer S is installed between the floor panel FP and the floor sheet FS to extend on and along the floor panel FP from the upper surface side of the floor panel FP, as a silencer that favorably absorbs noises respectively with a frequency in a low-to-mid frequency band.

Figure 2:
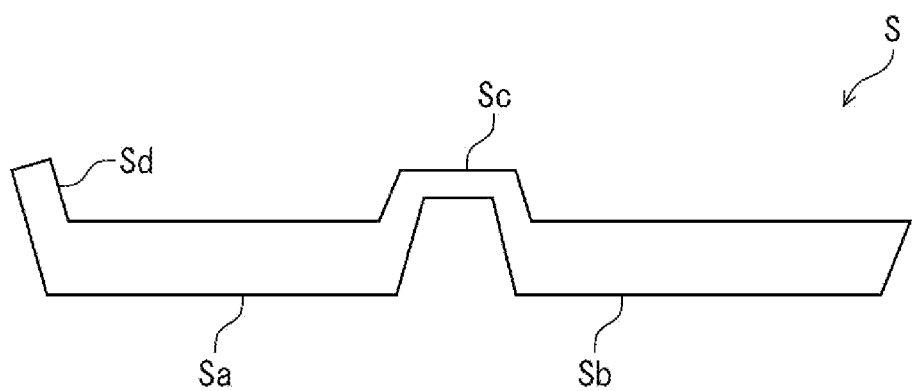
FIG. 2 is an enlarged side view of the floor silencer in FIG. 1.

As illustrated in FIG. 1 or FIG. 2, the floor silencer S includes a front silencer portion Sa, a rear silencer portion Sb, and a middle silencer portion Sc positioned between the front silencer portion Sa and the rear silencer portion Sb.

The front silencer portion Sa is, as illustrated in FIG. 1, installed on and along a front portion FPa of the floor panel FP. The silencer portion Sa extends at its front end portion Sd along the lower end portion of the dash panel DP.

Meanwhile, the rear silencer portion Sb is installed on and along a rear portion FPb of the floor panel FP. The middle silencer portion Sc is formed in an inverted substantially U shape to extend on and along a middle convex portion FPc (see FIG. 1) of the floor panel FP. The middle silencer portion Sc is formed integrally with the front silencer portion Sa and the rear silencer portion Sb between the front and rear silencer portions Sa and Sb.

Here, a detailed description will be given on a configuration of the floor silencer S. The floor silencer S includes a plurality of mixed members P, a plurality of mixed members Q, and a binder U (adhesive) made of thermosetting resin (see FIG. 3), as will be described below. The plurality of mixed members P or the plurality of mixed members Q are formed with a scrap part 100 (see FIG. 4), as described below. As the thermosetting resin that is a material for forming the binder U, urethane is used. Additionally, hereinafter, in the first embodiment, the mixed members P are also referred to as first mixed members P, and the mixed members Q are also referred to as second mixed members Q.

The scrap part 100 is a roof part of a motor vehicle, used as a layered composite raw material for manufacturing the floor silencer S. In the first embodiment, an example of the scrap part 100 includes a roof part installed already on a motor vehicle to be repaired or scrapped or a roof part subject to quality defect, even if it is a newly manufactured roof part.

Figure 4:
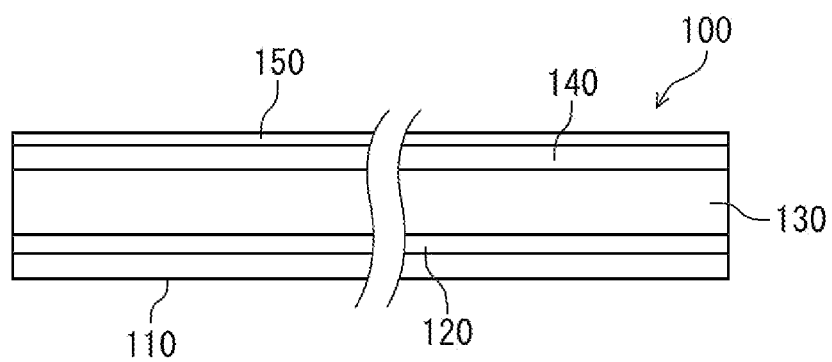
FIG. 4 is a partially cutaway enlarged side view of a scrap member according to the first embodiment.

As illustrated in FIG. 4, the scrap part 100 has a layered structure of a skin layer 110, a glass fiber layer 120, a foamed urethane layer 130, a glass fiber layer 140, and a back layer 150.

In the scrap part 100, The skin layer 110 is formed in a layered form with a non-woven fabric formed by entangling a plurality of fibers without weaving or knitting them. The glass fiber layer 120 is formed in a layer shape by mixing a plurality of glass fibers with an adhesive and entangling the plurality of glass fibers with each other, and under curing of the adhesive. In the first embodiment, the glass fiber layer 120 is hereinafter referred to as a skin layer-side glass fiber layer 120.

The skin layer-side glass fiber layer 120 is layered between the skin layer 110 and the foamed urethane layer 130. Thus, the skin layer-side glass fiber layer 120 plays a role of reinforcing each strength of the skin layer 110 and the foamed urethane layer 130 with the elasticity and rigidity of the plurality of entangled glass fibers thereof.

The foamed urethane layer 130 is formed in a layered form with foamed urethane. As in the case of the skin layer-side glass fiber layer 120, the glass fiber layer 140 is formed in a layer shape by mixing a plurality of glass fibers with an adhesive and entangling the plurality of glass fibers with each other, and under curing of the adhesive. In the first embodiment, the glass fiber layer 140 is hereinafter referred to as a back layer-side glass fiber layer 140.

The back layer-side glass fiber layer 140 is layered between the foamed urethane layer 130 and the back layer 150. The back layer-side glass fiber layer 140 plays a role of reinforcing each strength of the foamed urethane layer 130 and the back layer 150 with at least one of the elasticity and rigidity of the plurality of entangled glass fibers thereof. The back layer 150 is formed in a layered shape by nonwoven fabric. In addition, the thickness of the back layer 150 is set to be thinner than that of the skin layer 110.

Figure 5A:
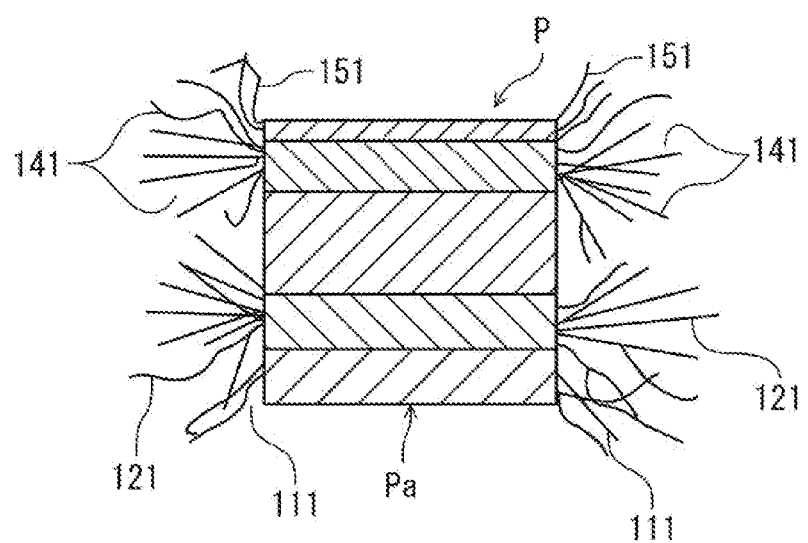
FIG. 5A is a side view of a first mixed member.

The plurality of first mixed members P described above each include a mixed main body Pa and a plurality of mixed fiber portions 111, 151, 121, and 141, as can be seen in the example illustrated in FIG. 5A. Here, the plurality of mixed fiber portions 111 and 151 (a plurality of nonwoven fabric fiber portions 111 and 151) are respectively formed by a plurality of fibers (nonwoven fabric fibers) extending in, for instance, a whisker-like form from each portion corresponding to the skin layer 110 and the back layer 150 of the mixed main body Pa. The plurality of mixed fiber portions 121 and 141 (a plurality of glass fiber portions 121 and 141) are respectively formed by a plurality of fibers (glass fibers) extending in, for instance, a whisker-like form from each portion corresponding to the skin layer-side glass fiber layer 120 and the back layer-side glass fiber layer 140 of the mixed main body Pa.

Figure 5B:
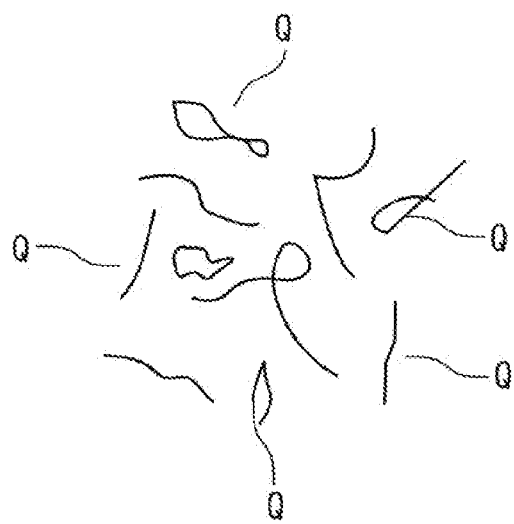
FIG. 5B is a view showing each of second mixed members by way of illustration.

The plurality of second mixed members Q are respectively formed by a short line (for example, a short fiber), a strip, or the like, as shown exemplarily by FIG. 5B.

The plurality of first mixed members P and the plurality of second mixed members Q configured as described above are formed as follows. Note that the first mixed members P and the second mixed members Q are respectively formed by numbers required for manufacturing the floor silencer S. Accordingly, the scrap part 100 are prepared by numbers required for manufacturing the floor silencer S.

The scrap part 100 thus prepared is first crushed by a crusher (not illustrated) to be formed into a plurality of crushed raw materials (not illustrated). Each of the plurality of crushed raw materials has a size within a range of, for example, 5 mm to 100 mm.

Then, the plurality of crushed raw materials are pulverized by a pulverizer (not illustrated) to be formed into a plurality of pulverized raw materials (not illustrated). Each of the plurality of pulverized raw materials has a size within a range of, for example, 2 mm to 50 mm.

Due to the nature as the pulverization by the pulverizer, the plurality of pulverized raw materials are respectively not a constant shape at their shapes but are respectively a different shape like, for instance, a steric or three-dimensional shape, a short linear or line shape, or a strip shape. Similarly, the pulverized raw materials are respectively not constant at their sizes but are different at their sizes. The size of the pulverized raw material of the steric shape or the strip shape is, for instance, determined by the maximum length, of each length between both opposing positions of the outer shape of the pulverized raw material. The size of the pulverized raw material of a linear shape is, in a case of, for instance, a short fiber, determined by the length of the short fiber.

In short, the size of the pulverized raw material, which differs depending on the shape of the pulverized raw material, is determined by a maximum dimension portion in the outer shape of the pulverized raw material. In addition, of the pulverized raw materials, the pulverized raw materials having respectively the steric shape form respectively the first mixed members P described above, and the pulverized raw materials having, for example, the short linear shape or the strip shape form respectively the second mixed members Q described above.

Here, the reason why the first mixed members P are formed by the mixed main body Pa and the plurality of mixed fiber portions 111, 151, 121, and 141, as described above will be described.

In the process of pulverizing the scrap part 100 after crushing as described above, since each forming material of the skin layer 110 and the back layer 150 of the scrap part 100 is nonwoven fabric, a plurality of glass fibers, which are each forming material of the skin layer 110 and the back layer 150 of the mixed main body Pa, are respectively extended in, for instance, a whisker-like form from the mixed main body Pa as the plurality of mixed fiber portions 111 and 151 without being cut for each mixed main body Pa in at least a portion of fibers thereof, when the mixed main body Pa is formed by pulverizing the crushed raw materials as described above.

Furthermore, in the process of pulverizing the scrap part 100 after crushing as described above, since each forming material of the skin layer-side glass fiber layer 120 and the back layer-side glass fiber layer 140 of the scrap part 100 is a plurality of glass fibers, a plurality of glass fibers, which are each forming material of the skin layer-side glass fiber layer 120 and the back layer-side glass fiber layer 140 of the mixed main body Pa, are respectively extended in, for instance, a whisker-like form from the mixed main body Pa as the plurality of mixed fiber portions 121 and 141 without being cut for each mixed main body Pa in at least a portion of fibers thereof, when the mixed main body Pa is formed by pulverizing the crushed raw materials as described above.

As is clear from the above description, the mixed members P each include the mixed main body Pa and the plurality of mixed fiber portions 111, 151, 121, and 141.

Here, for manufacturing the floor silencer S, the plurality of first mixed members P and the plurality of second mixed members Q forming the floor silencer S are specified as follows.

In order for the floor silencer S to play a role as a silencer for being capable of favorably absorbing noises respectively with a frequency in the low-to-mid frequency band as described above, the sizes and the numbers of each of the first mixed members P and the second mixed members Q, which are dispersedly layered in urethane U as described below, are set such that the floor silencer S can favorably absorb noises respectively with a frequency in the low-to-mid frequency band.

Figure 6:
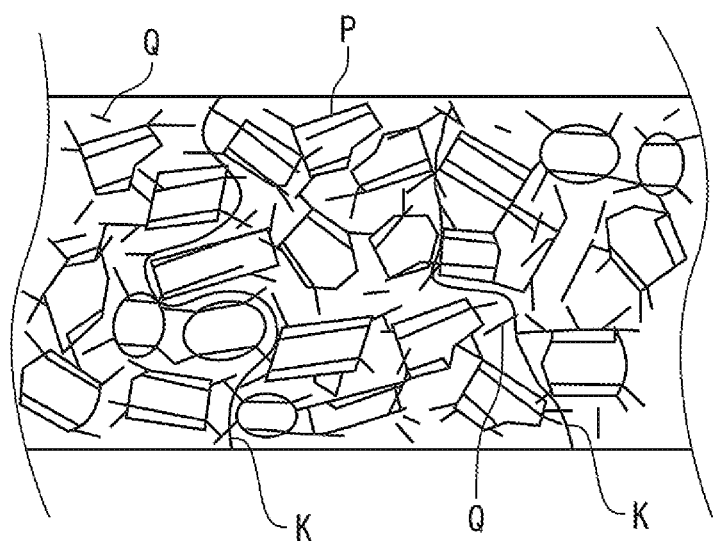
FIG. 6 is a partially cutaway enlarged cross-sectional view for explaining a path through which noises pass in interior of the floor silencer.

In the floor silencer S, the plurality of first mixed members P are dispersedly layered in the urethane U, from the lower surface to the upper surface of the floor silencer S as described below. Accordingly, a plurality of paths K are formed between and along the plurality of mixed main bodies Pa facing each other in the urethane U, from the lower surface to the upper surface of the floor silencer S (see FIG. 6). Here, as illustrated in FIG. 6, the plurality of second mixed members Q are dispersedly located in each of the paths K described above, together with the plurality of mixed fiber portions 111, 151, 121, and 141 of the plurality of first mixed members P, in the urethane U. Additionally, hereinafter, the plurality of paths K described above are respectively referred to as a labyrinthine path K.

When noises enter the lower surface of the floor silencer S having the configuration described above, the noises enter both each mixed main body Pa of the plurality of first mixed members P and each of the labyrinthine paths K.

Here, each of the mixed main bodies Pa of the plurality of first mixed members P is a solid of a steric shape, but has air permeability. therefore, the noises pass through each of the mixed main bodies Pa.

Each of the plurality of mixed fiber portions 111, 151, 121, and 141 of the plurality of first mixed members P are dispersedly located in each of the labyrinthine paths K. The plurality of second mixed members Q have, as described above, respectively a short linear shape or a strip shape, and are dispersedly located in each of the labyrinthine paths K together with each of the plurality of mixed fiber portions 111, 151, 121, and 141 of the plurality of first mixed members P. Therefore, it is easy for the noises to pass through each of the labyrinthine paths K in which the plurality of mixed fiber portions 111, 151, 121, and 141 and the second mixed members Q are dispersed as described above, compared with the mixed main bodies Pa each of which is a solid of a steric shape.

Thus, the noises mainly pass inside each of the labyrinthine paths K through each of the mixed fiber portions 111, 151, 121, and 141 and each of the mixed members Q.

In the process in which the noises pass inside each of the labyrinthine paths K in this way, each of the labyrinthine paths K plays the role of exhausting or depleting the vibration energy of the noises by travelling the noises along its labyrinthine shape Moreover, the noises passing inside the labyrinthine paths K travel while colliding with each of the mixed fiber portions 111, 151, 121, and 141 and each of the mixed members Q. Accordingly, each of the plural fibers of each of the mixed fiber portions 111, 151, 121, and 141 and each of the mixed members Q play as a role of exhausting or depleting the vibration energy of the noises by vibrating in response to the collision with the noises.

In other words, each of the labyrinthine paths K plays as a role of reducing the noises by exhausting the vibration energy of the noises, under cooperation with each of the plurality of fibers of the mixed fiber portions 111, 151, 121, and 141 and each of the mixed members Q.

In the first embodiment, premised on the noise propagation configuration of the floor silencer S as described above, in order for the floor silencer S to favorably absorb noises respectively with a frequency in the low-to-mid frequency band, each of the mixed main bodies Pa of the plurality of first mixed members P is assumed to be formed from, for example, pulverized raw materials having a steric shape and a size that is 15 mm or larger, of the plurality of pulverized raw materials. The plurality of second mixed members Q are assumed to be formed from, for instance, pulverized raw materials having a linear shape or a strip shape and a size that is 5 mm or smaller, of the plurality of pulverized raw materials formed as described above.

In addition, the size of each of the mixed main bodies Pa and each of the second mixed members Q are respectively assumed to be 15 mm or larger and 5 mm or smaller. However, the size of each of the mixed main bodies Pa and the size of each of the second mixed members Q may are respectively a size enough to satisfy the noise propagation configuration of the floor silencer S as described above.

Next, a method of manufacturing the floor silencer S will be described. Specifically, the floor silencer S is manufactured as follows, using the plurality of first mixed members P, the plurality of second mixed members Q and the urethane U formed as described above.

The plurality of first mixed members P and the plurality of second mixed members Q are charged or loaded into a mixer (not illustrated) together with the urethane U in a liquid state. The plurality of first mixed members P and the plurality of second mixed members Q charged in this way are stirred and mixed with the urethane U by the mixer, and are formed as a stirred mixture body according to curing of the urethane U. Additionally, the stirred mixture body is formed to have a shape in which the plurality of first mixed members P and the plurality of second mixed members Q are dispersedly layered in the urethane U.

The stirred mixture body formed as described above is put between an upper mold and a lower mold of a press mold (not illustrated). Then, the upper mold put in such a way is lowered toward the lower mold while a steam generator (not illustrated) blows steam between the upper mold and the lower mold of the press mold. Thus, the stirred mixture body is press-molded into a predetermined layer shape corresponding to the steric shape of the floor silencer S. The thickness of the floor silencer S is, for instance, 25 mm. In addition, the thickness of the floor silencer S is not particularly limited to 25 mm, and may be a normal thickness of a floor silencer installed in various motor vehicles.

Figure 3:
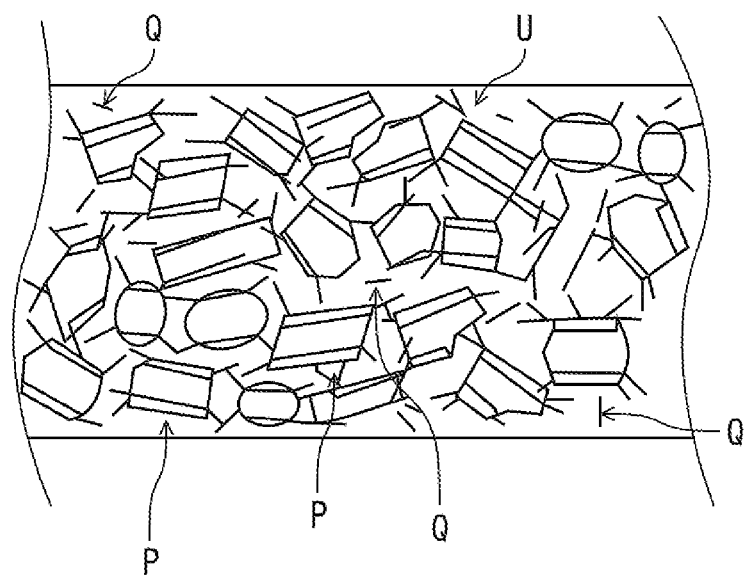
FIG. 3 is a partially cutaway enlarged cross-sectional view of the floor silencer in FIG. 2.

In this way, the floor silencer S (see FIG. 2) is manufactured. As illustrated in FIG. 3, the floor silencer S has a layered structure in which the plurality of first mixed members P and the plurality of second mixed members Q are dispersedly layered in the urethane U.

With such a layered structure, the labyrinthine paths K described above are each formed to extend from the lower surface side to the upper surface side of the floor silencer S, between the mixed main bodies Pa facing each other in the urethane U, as illustrated in FIG. 6.

The nonwoven fabric fiber portions 111 and 151 and the glass fiber portions 121 and 141 extending from each of the mixed main bodies Pa facing each other, as well as each of the second mixed members Q located between each of the mixed main bodies Pa facing each other are dispersedly located in each of the labyrinthine paths K.

As described above, the floor silencer S is manufactured as a silencer that may exhibit a function capable of favorably absorbing noises respectively with a frequency in the low-to-mid frequency band.

In the first embodiment configured as described above, the floor silencer S is, as described above, formed as follows at its configuration so as to exhibit excellent sound absorbing performance against noises respectively with a frequency in the low-to-mid frequency band.

(1) The floor silencer S is formed to have a layered structure in which the plurality of mixed members P and the plurality of mixed members Q are dispersedly layered in the urethane U as illustrated in FIG. 3.

(2) The shape and the size of the mixed main body Pa and the shape and the size of the second mixed member Q are set to ensure excellent sound absorbing performance of the floor silencer S.

(3) In the floor silencer S, the plurality of labyrinthine paths K are formed between the plurality of mixed main bodies Pa facing each other in the urethane U. The plurality of mixed fiber portions 111, 151, 121, and 141 of each of the first mixed members P and each of the second mixed members Q are dispersedly located in each of the labyrinthine paths K.

When the gasoline motor vehicle is in, for instance, a forward running or travelling state under such configuration of the floor silencer S, the gasoline motor vehicle starts to travel forward under starting of the engine E with rotations of the left and right front wheels FW and the left and right rear wheels RW along a road surface L (see FIG. 1).

When in such forward traveling state road noises are produced from the road surface L via the left and right front wheels FW and the left and right rear wheels RW, the road noises travel toward the inside of the vehicle compartment 10 by passing mainly through a portion of the front silencer portion Sa excluding the front end portion Sd, the rear silencer portion Sb and the middle silencer portion Sc of the floor silencer S via the floor panel FP. Here, the road noises pass at their portions through the front end portion Sd of the front silencer portion Sa via the left and right rear wheels RW and the lower end of the dash panel DP, and travel toward the inside of the vehicle compartment 10.

Figure 7:
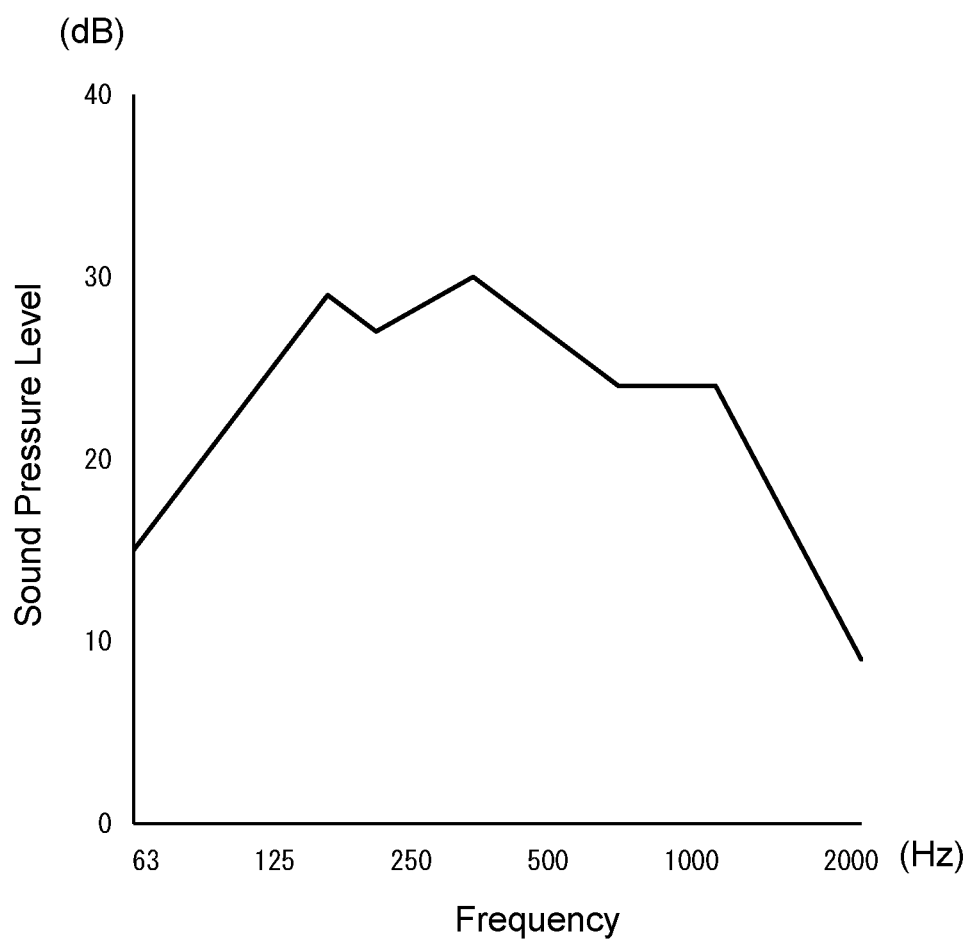
FIG. 7 is a graph illustrating frequency characteristics of road noises according to the first embodiment.

In addition, the road noises traveling as described above have respectively a frequency in the low-to-mid frequency range as described above. The road noises each have frequency characteristics relative to its sound pressure level as illustrated in a graph of FIG. 7. By the graph 7, it can be seen that a sound pressure level of each of road noises respectively with a frequency in the low-to-mid frequency band (100 Hz to 1000 Hz) is high.

However, the floor silencer S exhibits excellent sound absorbing performance against road noises with the above configuration. Therefore, road noises respectively with frequencies in the low-to-mid frequency band can be favorably reduced by the front silencer portion Sa, the rear silencer portion Sb, and the middle silencer portion Sc of the floor silencer S.

In other words, road noises traveling into the vehicle compartment 10 from the left and right front wheels FW through the front end portion Sd of the floor silencer S can be favorably absorbed by the floor silencer S together with road noises traveling into the vehicle compartment 10 through the floor panel FP and a portion excluding the front end portion Sd of the floor silencer S. As a result, even when the gasoline motor vehicle is traveling forward, occupants in the vehicle compartment 10 secure comfortable riding feel without uncomfortableness based on the road noises.

Figure 8:
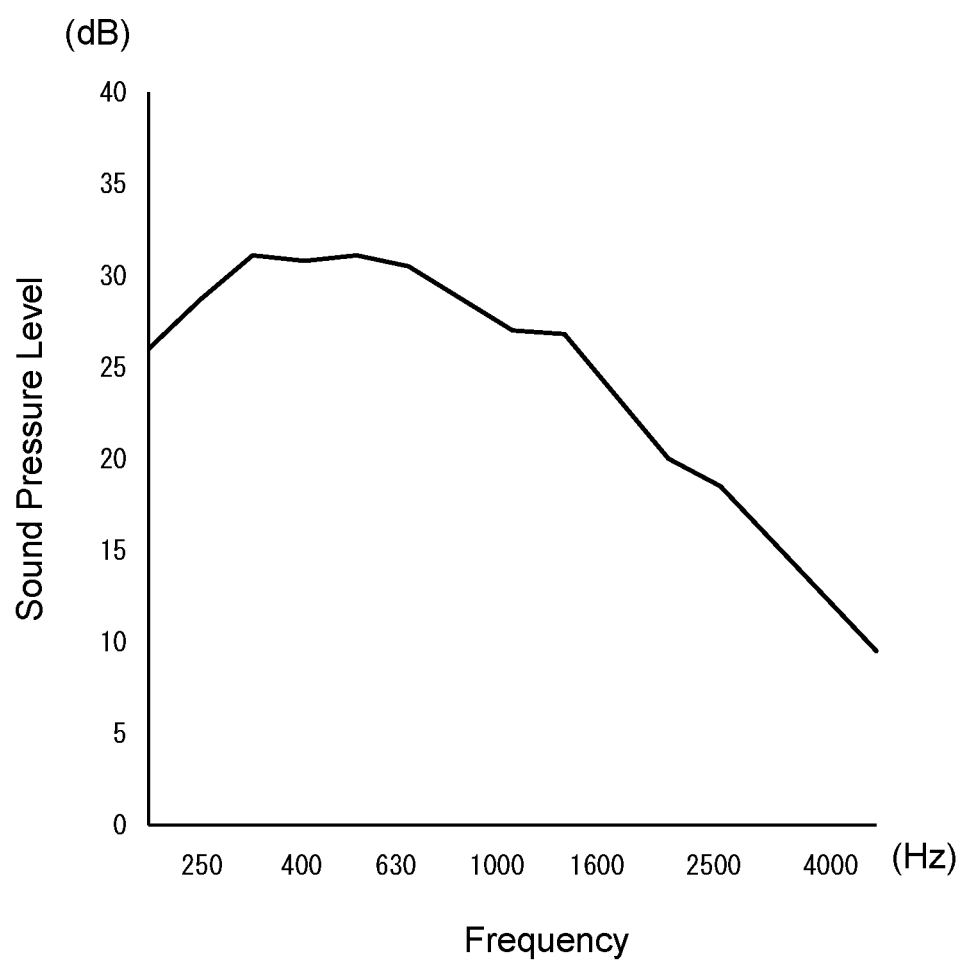
FIG. 8 is a graph illustrating frequency characteristics of engine noises according to the first embodiment.

In addition, the noises (hereinafter, referred to as engine noises) produced by the engine E are absorbed by a dash silencer DS (see FIG. 1) installed along the dash panel DP. The engine noises have respectively frequency characteristics relative to its sound pressure level, as illustrated in a graph of FIG. 8. By the graph 8, it can be seen that the sound pressure level is high over a wide frequency band (250 Hz to 4000 Hz).

By the way, the sound absorbing performance of the floor silencer S of the first embodiment was measured by a sound absorption coefficient test based on a reverberation chamber method. For the measurement, a sample having the same configuration as the floor silencer S (hereinafter, referred to as a working sample 1) was prepared. For the comparison with the working sample 1, a sample formed by a single layer sound absorbing material was prepared. Hereinafter, the sample is referred to as a comparative sample 2. Additionally, the single layer sound absorbing material is formed by a nonwoven fabric of a single layer having a thickness of 25 mm.

Figure 9:
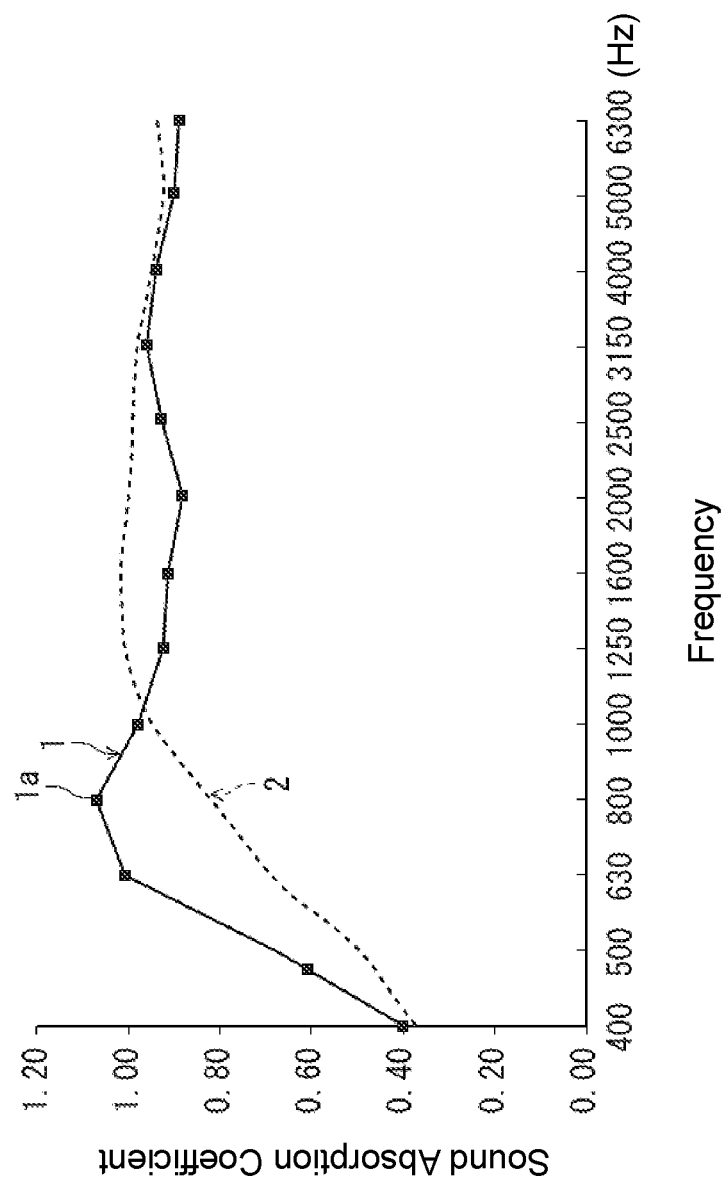
FIG. 9 is a graph illustrating frequency characteristics of sound absorption coefficients of a working sample and a comparative sample according to the first embodiment.

The sound absorbing performance of the working sample 1 was measured by the above-mentioned sound absorption coefficient test. The result of the measurement was illustrated by a graph 1 shown in FIG. 9. The graph 1 is a graph illustrating the sound absorption coefficient of the working sample 1 relative to the frequency. In graph 1, the sound absorption coefficient has a peak value (see a reference numeral 1a in FIG. 9) at a frequency of 800 Hz.

The sound absorbing performance of the comparative sample 2 was also measured by the above-mentioned sound absorption coefficient test. The result of the measurement was illustrated by a graph 2 shown in FIG. 9. The graph 2 is a graph illustrating the sound absorption coefficient of the comparative sample 2 relative to the frequency.

Comparing both the graph 1 and 2, it can be seen that the sound absorption coefficient of the graph 1 is higher than that of the graph 2, in the low-to-mid frequency band, that is, a frequency range (400 Hz to 1000 Hz) including the frequency 800 Hz. This means that the working sample 1 has a higher sound absorption coefficient, compared with the comparative sample 2, at frequencies in the low-to-mid frequency band.

Thus, it is understood that the working sample 1 is capable of exhibiting favorable sound absorbing performance against the road noises described above, as compared with the comparative sample 2. This means that the floor silencer S has excellent sound absorbing performance, as compared with the comparative sample 2.

Here, the relationship between the sound absorption coefficient of the floor silencer S and frequencies of noises was examined, using the size of the mixed main body Pa of the first mixed member P as a parameter. As a result, it has been found that the peak value of the sound absorption coefficient shifts toward the low-to-mid frequency band side, as the size of the mixed main body Pa increases, and the peak value of the sound absorption coefficient shifts toward the high frequency band side, as the size of the mixed main body Pa decreases. Therefore, it has been found that in case of mainly absorbing the road noises, the size of the mixed main body Pa may be set to be large so as to shift the peak value of the sound absorption coefficient toward the low-to-mid frequency range, for instance, as illustrated in the graph 1 of FIG. 9.

Furthermore, the relationship between the size of the mixed main body Pa, air permeability of the mixed main body Pa, and the frequency of each of the noises was also examined, along with the examination on the relationship between the sound absorption coefficient of the floor silencer S and the frequency of each of the noises, using the size of the mixed main body Pa of the first mixed member P as a parameter as described above. As a result, it has been also found that the larger the size of the mixed main body Pa, the lower the air permeability of the mixed main body Pa. Thus, the floor silencer S can favorably absorb noises respectively with a frequency in the low-to-mid frequency band.

Second Embodiment

Figure 10:
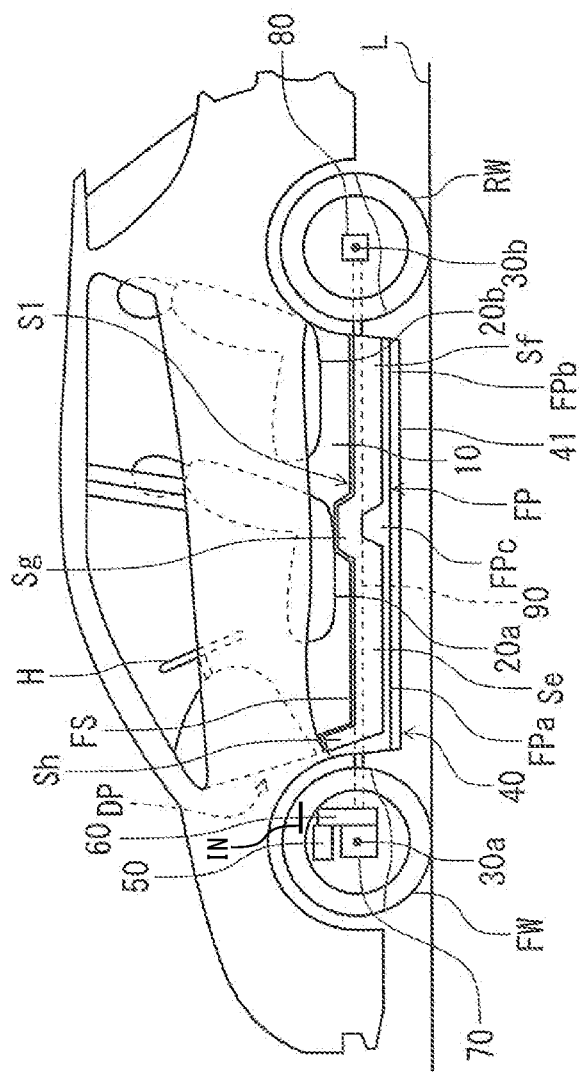
FIG. 10 is a partially cutaway schematic side view of a motor vehicle to which a second embodiment of a floor silencer for the motor vehicle according to the present invention is applied.

FIG. 10 illustrates a second embodiment of the present invention applied to a motor vehicle. The motor vehicle is one of electric motor vehicles. The electric motor vehicle includes a vehicle compartment 10 as in the gasoline motor vehicle described in the first embodiment. As in the gasoline motor vehicle described above, the electric motor vehicle has left and right front seats 20a (only the left front seat 20a is illustrated in FIG. 10) and left and right back seats 20b (only the left back seat 20b is illustrated in FIG. 10) disposed in the vehicle compartment 10.

In the electric motor vehicle, left and right front wheels FW (only the left side front wheel is illustrated in FIG. 10) and left and right rear wheels RW (only the left side rear wheel is illustrated in FIG. 10) are respectively supported by front and rear axles 30a and 30b, as in the gasoline motor vehicle described above. Furthermore, the floor panel FP and the floor sheet FS described in the first embodiment are similarly disposed as a floor panel and a floor sheet of the vehicle compartment 10 in the second embodiment.

The electric motor vehicle further includes a battery set 40, as illustrated in FIG. 10. The battery set 40 is attached to the floor panel FP from the lower surface side of the floor panel FP. This battery set 40 includes a casing 41 and a battery group (not illustrated) including a plurality of batteries accommodated in the casing 41. The casing 41 is attached at its upper wall to the lower surface of the floor panel FP. In the second embodiment, the floor panel FP corresponds to a floor wall of the vehicle compartment 10. Thus, the casing 41 is formed to have a flat rectangular shape, along the floor wall (floor panel FP) of the vehicle compartment 10.

The batteries of the battery group described above are respectively arranged in the casing 41. The battery group is connected to an electric motor 50 via an inverter IN (see FIG. 10) so as to be capable of driving the electric motor 50. In addition, the electric motor 50 is supported by a portion of the vehicle body of the electric motor vehicle, immediately above a center portion of the front axle 30a in its axial direction. The inverter IN is disposed in a portion of the vehicle body of the electric motor vehicle, the portion being located near the electric motor 50. The inverter IN is connected between the electric motor 50 and the battery group, thereby to adjust the output from the battery group so as to supply the resultant output to the electric motor 50.

The electric motor vehicle includes as its driving system a transfer mechanism 60, a front differential mechanism 70, and a rear differential mechanism 80, in addition to the electric motor 50 described above.

The transfer mechanism 60 plays a role of distributing and transmitting power, obtained by the rotation of the electric motor 50, to the front differential mechanism 70 and the rear differential mechanism 80. Additionally, the transfer mechanism 60 is supported by the other portion of the vehicle body behind the electric motor 50.

The front differential mechanism 70 is assembled to the center portion of the front axle 30a in its axial direction. The front differential mechanism 70 transmits differentially power to the left and right front wheels FR through the front axle 30a, based on the distributed power from the transfer mechanism 60.

The rear differential mechanism 80 is assembled to a center portion of the rear axle 30b in its axial direction. The rear differential mechanism 80 is connected to the differential mechanism 60 via a propeller shaft 90. The rear differential mechanism 80 receives the distributed power from the differential mechanism 60 via the propeller shaft 90. Accordingly, the rear differential mechanism 80 transmits differentially the distributed power transmitted from the propeller shaft 90 to the left and right rear wheels RW via the rear axle 30b.

As illustrated in FIG. 10, the electric motor vehicle includes a floor silencer S1 according to the present invention. The floor silencer S1 is interposed between the floor panel FP and the floor sheet FS. The floor silencer S1 is mounted on the floor panel FP to face the battery set 40 through the floor panel FP.

As illustrated in FIG. 10, the floor silencer S1 includes a front silencer portion Se, a rear silencer portion Sf, and a middle silencer portion Sg respectively corresponding to the front silencer portion Sa, the rear silencer portion Sb, and the middle silencer portion Sc positioned between the front silencer portion Sa and the rear silencer portion Sb, each described in the first embodiment.

As illustrated in FIG. 10, the front silencer portion Se is installed on and along a front portion FPa of the floor panel FP, as in the case of the front silencer portion Sa described in the first embodiment. The front silencer portion Se extends at its front end portion Sh along a lower end of a dash panel DP.

Meanwhile, the rear silencer portion Sf is installed on and along a rear portion FPb of the floor panel FP, as in the case of the rear silencer portion Sb described in the first embodiment. The middle silencer portion Sg is formed to be in an inverted substantially U shape so as to extend on and along a middle convex portion FPc (see FIG. 10) of the floor panel FP, as in the case of the middle silencer portion Sc described in the first embodiment. The middle silencer portion Sg is formed between and integrally with the front silencer portion Se and the rear silencer portion Sf.

Here, a detailed description will be given on a configuration of the floor silencer S1. The floor silencer S1 is formed by press molding, using the press mold described above, a stirred mixture body, in which a plurality of first mixed members P and a plurality of second mixed members Q are stirred and mixed with urethane U as in the case of the floor silencer S described in the first embodiment, into a steric shape similar to that of the floor silencer S1.

In addition, in the second embodiment, for absorbing noises respectively with a frequency in the low-to-mid frequency band and in the high frequency band, the size of each of the mixed main bodies Pa of the plurality of first mixed members P is set to be a size within a range of, for example, 10 mm to 20 mm, so as to include also sizes in a range smaller than that of the mixed main bodies Pa in the first embodiment.

Although the size of the mixed main bodies Pa is set to be within a range of 10 mm to 20 mm in the second embodiment, without being limited to the size, the size of each of the mixed main bodies Pa may be set to be a size in any range of a size capable of favorably absorbing noises respectively with a frequency in the high frequency band, in addition to noises respectively with a frequency in the low-to-mid frequency band.

In the second embodiment configured as described above, the floor silencer S1 is formed as follows to exhibit excellent sound absorbing performance against noises with frequencies in the high frequency band, in addition to noises respectively with a frequency in the low-to-mid frequency band, as described above.

(1) The floor silencer S1 is formed to have a layered structure in which the plurality of first mixed members P and the plurality of second mixed members Q are layered dispersedly in the urethane U, as illustrated in FIG. 3.

(2) For absorbing noises respectively with a frequency over the low-to-mid frequency band and the high frequency band, the size of each of the mixed main bodies Pa of the plurality of mixed members P is set to include sizes in a range smaller than that of the mixed main bodies Pa in the first embodiment, as described above. The plurality of second mixed members Q each have the same short linear shape or strip shape and size as that in the first embodiment.

Furthermore, the number of the first mixed member P and the number of the second mixed member Q are set so as to be capable of ensuring excellent sound absorbing performance of the floor silencer S1 against noises respectively with a frequency over the low-to-mid frequency band and the high frequency band, under cooperation with the size of the mixed main bodies Pa in the second embodiment and the size of the mixed main body Pa in the first embodiment, and the shape and the size of the second mixed members Q described above.

(3) In the layered structure of the floor silencer S1, a plurality of labyrinthine paths K are formed as in the first embodiment. A plurality of mixed fiber portions 111, 151, 121, and 141 of each of the first mixed members P and each of the second mixed members Q are dispersedly located in the labyrinthine paths K, as in the first embodiment.

Assuming such a configuration, when for starting the electric motor vehicle the battery group in the battery set 40 supplies electric power to the electric motor 50 via the inverter, the electric motor 50 is started. Along with the starting, the power is distributed by the transfer mechanism 60 from the electric motor 50 to the front differential mechanism 70 and the rear differential mechanism 80.

Then, the front differential mechanism 70 transmits the distributed power from the transfer mechanism 60 to the left and right front wheels FW through the front axle 30a, and the rear differential mechanism 80 receives the distributed power from the transfer mechanism 60 through the propeller shaft 90, thereby to transmit the distributed power to the left and right rear wheels RW through the rear axle 30b.

Accordingly, the electric motor vehicle starts to travel forward for example, by rotating the left and right front wheels FW and the left and right rear wheels RW along the road surface L (see FIG. 10). The electric motor vehicle that has started running in this way travels forward under rotating the left and right front wheels FW and left and right rear wheels RW thereof along the road surface L.

When road noises are generated from the road surface L through the left and right front wheels FW and the left and right rear wheels RW in such a forward running state, the road noises travel toward the inside of the vehicle compartment 10 through the floor silencer S1 instead of the floor silencer described in the first embodiment. When the battery group in the battery set 40 and the inverter generate respectively noises as battery noises along with supply of the electric power to the electric motor 50, the battery noises pass through the floor silencer S1 via the floor panel FP and travel toward the inside of the vehicle compartment 10.

The road noises traveling as described above have frequencies in the low-to-mid frequency range, whereas the battery noises traveling as described above have frequencies in the high frequency range.

However, since the floor silencer S1 has the configuration described above, the floor silencer S1 have excellent sound absorbing performance not only for the noises respectively with a frequency in the low-to-mid frequency range, but also for noises respectively with a frequency in the high frequency band.

Therefore, the road noises respectively with a frequency in the low-to-mid frequency band and the battery noises respectively with a frequency in the high frequency band can be favorably absorbed by the floor silencer S1. Thus, the road noises respectively with a frequency in the low-to-mid frequency band and the battery noises respectively with a frequency in the high frequency band entering the floor silencer S1 can be largely reduced.

As a result, even while the electric motor vehicle is traveling forward, the occupants in the vehicle compartment 10 are capable of ensuring comfortable riding feelings without uncomfortableness due to both the road noises respectively with a frequency in the low-to-mid frequency band and the battery noises respectively with a frequency in the high frequency band. Other operations and effects are the same as those in the first embodiment.

By the way, the sound absorbing performance of the floor silencer S1 of the second embodiment was measured by the sound absorption coefficient test of reverberation room method, as in the first embodiment. For the measurement, a sample (hereinafter, referred to as a working sample 3) with the same configuration as the floor silencer S1 was prepared. For the comparison with the working sample 3, a sample (hereinafter, referred to as a comparative sample 4) formed from a single layer of sound absorbing material was prepared. In addition, the single layer sound absorbing material is formed by a nonwoven fabric layer of a single layer having a thickness of 25 mm.

Figure 11:
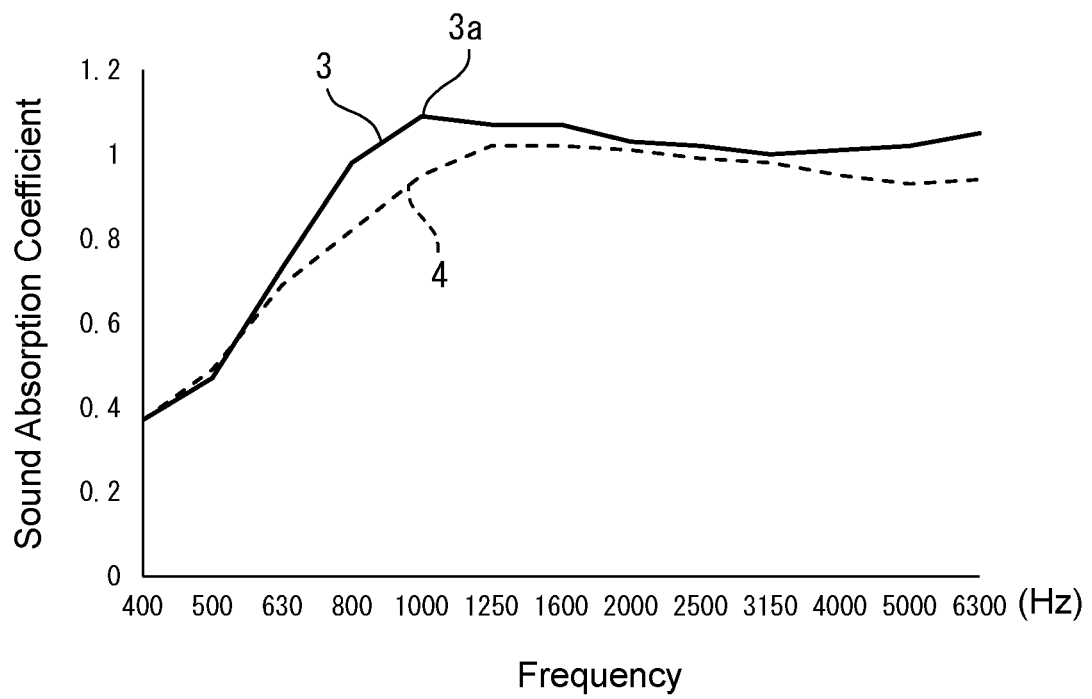
FIG. 11 is a graph illustrating frequency characteristics of sound absorption coefficients of a working sample and a comparative sample according to the second embodiment.

The sound absorbing performance of the working sample 3 was measured by the above sound absorption coefficient test. The measurement result was obtained as a graph 3 shown in FIG. 11. The graph 3 is a graph illustrating the sound absorption coefficient of the working sample 3 relative to frequencies. In the graph 3, the sound absorption coefficient has a peak value (see reference numeral 3a in FIG. 11) around a frequency of 1000 Hz. By the graph 3, it can be seen that the peak value is shifted toward the high frequency band side, as compared with that in the graph 1 (see FIG. 9) described in the first embodiment.

Furthermore, the sound absorbing performance of the comparative sample 4 was measured by the above sound absorption coefficient test. The measurement result was obtained as a graph 4 shown in FIG. 11. The graph 4 is a graph illustrating the sound absorption coefficient of Comparative Sample 4 relative to frequencies.

Comparing both the graphs 3 and 4, it can be seen that the sound absorption coefficient of the working sample 3 is higher than that of the comparative sample 4, in a range of a frequency band (630 Hz to 1600 Hz) including the frequency of the peak value 3a in the graph 3. In other words, it is also found that the sound absorption coefficient of the working sample 3 is higher than that of the comparative Sample 4 not only at frequencies in the low-to-mid frequency band but also at frequencies in the high frequency band.

Therefore, it can be found that the working sample 3 may exhibit excellent sound absorbing performance against the road noises respectively with a frequency in the low-to-mid frequency band and the battery noises respectively with a frequency in the high frequency band, in comparison with the comparative sample 4. This means that the floor silencer S1 has excellent sound absorbing performance, as compared with the comparative sample 4.

Third Embodiment

Figure 12:
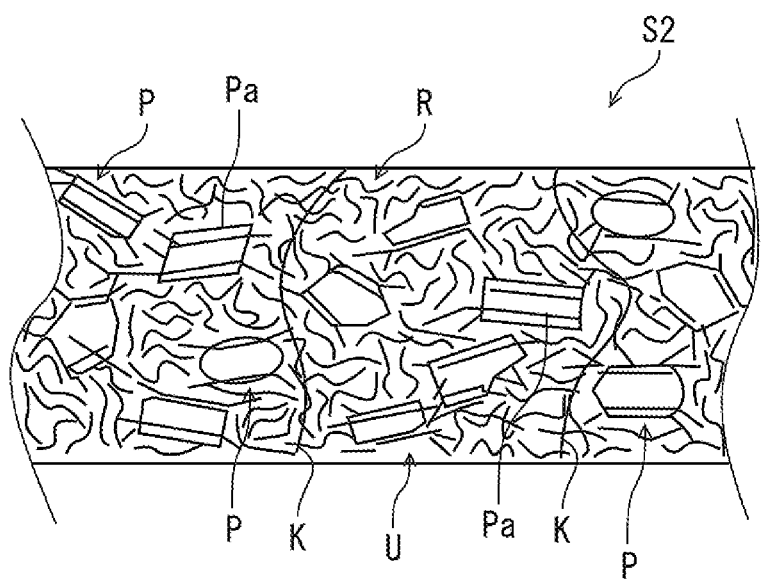
FIG. 12 is a partially cutaway enlarged cross-sectional view illustrating a main portion of a third embodiment of a floor silencer for a motor vehicle according to the present invention.

FIG. 12 illustrates a main portion of a third embodiment of a floor silencer according to the present invention.

As illustrated in FIG. 12, the floor silencer (hereinafter, referred to as a floor silencer S2) according to the third embodiment includes a fiber member R in addition to the plurality of mixed members P described in the first embodiment. Additionally, the plurality of mixed members Q are not adopted in the third embodiment.

In the third embodiment, the fiber member R is adopted as the purpose for reducing weight of the floor silencer S2, while ensuring the excellent sound absorbing performance of the floor silencer S2 against noises respectively with a frequency in the low-to-mid frequency band, as with the case of the floor silencer S according to the first embodiment. Along with the purpose, in the third embodiment, the fiber member R is formed from, for example, cotton-like felt fibers.

Assuming such a configuration, for manufacturing the floor silencer S2, the plurality of mixed members P and the fiber member R are charged into the mixer described in the first embodiment together with the urethane U in a liquid form described in the first embodiment, and are stirred and mixed by the mixer. Thereafter, as the urethane U is cured, the plurality of mixed members P and the fiber member R are dispersedly layered in the urethane U. In this way, the floor silencer S2 is manufactured.

Here, for manufacturing the above-mentioned floor silencer S2, a mixture ratio of the mixed members P and the fiber member R is set to, for instance, 70%:30% in order to ensure the same sound absorbing performance as that of the floor silencer S1 according to the first embodiment and also to ensure weight reduction of the floor silencer S2.

In the third embodiment, the mixture ratio of the mixed members P and the fiber member R is set to be 70%:30%, as described above. However, the mixture ratio changes in accordance with the shape of the mixed main body Pa of each of the mixed members P, each of target values (NV target values) of noise and vibration permissible in an electric motor vehicle, and a target mass for weight reduction of the floor silencer S2 due to a demand for weight reduction of the electric motor vehicle. Therefore, the mixture ratio is not limited to 70%:30% described above, and may be set in accordance with the shape of the mixed main body Pa of each of the mixed members P, the NV target values for the electric motor vehicle, and the target mass for weight reduction of the floor silencer S2.

With the mixture ratio described above, the number of the mixed member P is much smaller than the number of the mixed member P in the first embodiment. Moreover, since the fiber member R is formed by the cotton-like felt fibers, the fiber member R is much lighter at its weight, compared with all the weights of the mixed members P respectively including the mixed main body Pa of the steric shape. This means that the floor silencer S2 is much lighter than the floor silencer S according to the first embodiment.

In the floor silencer S2 according to the third embodiment, the plurality of mixed members P are dispersedly layered in the urethane U together with the fiber member R, as described above. Therefore, as illustrated in FIG. 12, in the floor silencer S2, a plurality of labyrinthine paths K are formed to pass between each mixed main body Pa of the plurality of mixed members P facing each other, as in the first embodiment. Accordingly, the plurality of mixed fiber portions of each of the mixed members P are dispersedly located in each of the labyrinthine paths K.

The fiber member R is dispersedly located as a collection of cotton-like fibers between the mixed main bodies Pa of each of the mixed members P facing each other. Accordingly, the cotton-like felt fibers that are the fiber member R are dispersedly located in each of the labyrinthine paths K together with the plurality of mixed fiber portions of each of the mixed members P. Other configurations are the same as those in the first embodiment.

In the third embodiment with the configuration described above, also in the floor silencer S2, noises passing through each of the labyrinthine paths K travel along the labyrinthine shape of each of the labyrinthine paths K, as in the first embodiment, and collide with the cotton-like fibers of the fiber member R and the plurality of mixed fiber portions of each of the mixed members P. Thus, the noises can be reduced by exhaustion of its vibration energy.

Moreover, in the third embodiment, the mixture ratio of the mixed members P and the fiber member R is set to be, for example, 70%:30%, as described above. Thus, the floor silencer S2 is lightweight.

Therefore, the floor silencer S2 may be formed as a silencer exhibiting excellent sound absorbing performance against noises respectively with a frequency in the low-to-mid frequency band and also being lightweight.

According to the third embodiment, the floor silencer S2 may favorably absorb the road noises respectively with a frequency in the low-to-mid frequency band described above, as in the first embodiment. As a result, even when the gasoline motor vehicle described in the first embodiment is traveling forward for example, the occupants in the vehicle compartment 10 are capable of ensuring comfortable riding feelings without uncomfortableness due to the road noises described above.

As described above, the floor silencer S2 is formed as a lightweight silencer. Therefore, the floor silencer S2 contributes to weight reduction of the gasoline motor vehicle in which the floor silencer S2 is to be installed.

As described above, according to the third embodiment, the floor silencer S2 may be provided as a floor silencer that may exhibit excellent sound absorbing performance against noises respectively with a frequency in the low-to-mid frequency band to offer comfortable riding feelings to the occupants as with the floor silencer S according to the first embodiment, and may sufficiently satisfy the demand for weight reduction of the parts installed in the gasoline motor vehicle.

By the way, plural samples respectively in which only the mixture ratio of the mixed members P and the fiber member R was changed in the floor silencer S2 are prepared. Then, how the change of the mixture ratio impacts the sound absorption coefficient of each of the plural samples was examined. As a result, it was found that as the mixture ratio of the fiber member R to the mixed members P increases, the peak value of the sound absorption coefficient in the frequency characteristics of the sound absorption coefficient moves toward the high frequency band side.

Furthermore, examination was conducted regarding the weight reduction of the floor silencer S1 described in the second embodiment. As a result, it has been found that by setting the mixture ratio of the mixed members P and the fiber member R to 50%:50%, it has been found to be capable of providing a floor silencer ensuring excellent sound absorbing performance against noises respectively with a frequency in the low-to-mid frequency band and the high frequency band, as in the floor silencer S1 and also ensuring the weight reduction as in the floor silencer S2 according to the third embodiment.

Therefore, If the floor silencer S1 according to the second embodiment is a floor silencer which is formed from the plurality of mixed members P, the fiber member R, and the urethane U as in the floor silencer S2 according to the third embodiment, and has the mixture ratio of the mixed members P and the fiber member R set to be 50%:50%, the number of the mixed member P in the floor silencer is much smaller than that of the mixed member P in the floor silencer S1 according to the second embodiment.

Thus, the floor silencer formed from the plurality of mixed members P, the fiber member R, and the urethane U with the mixture ratio set to 50%:50% can be provided as a floor silencer that may exhibit excellent sound absorbing performance against noises respectively with a frequency in the low-to-mid frequency band and the high frequency band, as in the floor silencer S1 according to the second embodiment, and may be much lighter, compared with the floor silencer S1 according to the second embodiment.

Fourth Embodiment

Figure 13:
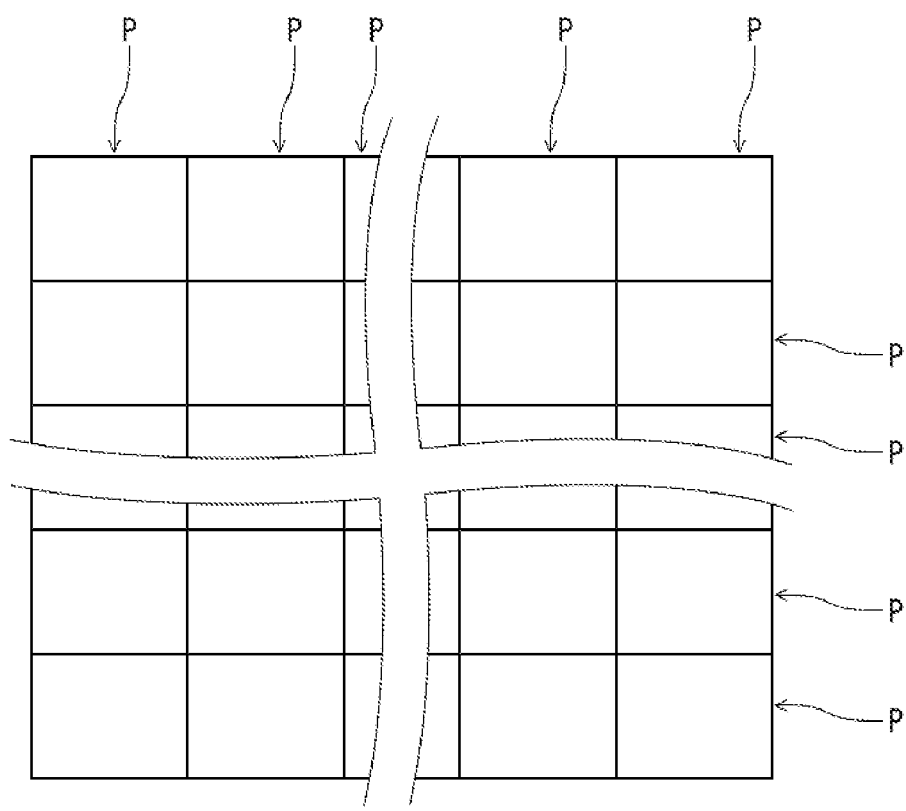
FIG. 13 is a partially cutaway plan view illustrating a scrap member that is a main portion of a fourth embodiment of a floor silencer for a motor vehicle according to the present invention, together with its lattice-like cutting lines.

FIG. 13 illustrates a main portion of a fourth embodiment of a floor silencer according to the present invention. The floor silencer according to the fourth embodiment includes the plurality of first mixed members P, the plurality of second mixed members Q and the urethane U of the floor silencer S according to the first embodiment.

In the fourth embodiment, the plurality of first mixed members P are formed by a plurality of cut members. Thus, the floor silencer according to the fourth embodiment is formed by the plurality of cut members being the plurality of first mixed members P, and the plurality of second mixed members Q and the urethane U of the floor silencer S according to the first embodiment.

In the fourth embodiment, the plurality of cut members, which are the plurality of first mixed members P, are formed as follows. The scrap part 100 described in the first embodiment includes the skin layer 110, the skin layer-side glass fiber layer 120, the foamed urethane layer 130, the back layer-side glass fiber layer 140, and the back layer 150, as described above.

Figure 14:
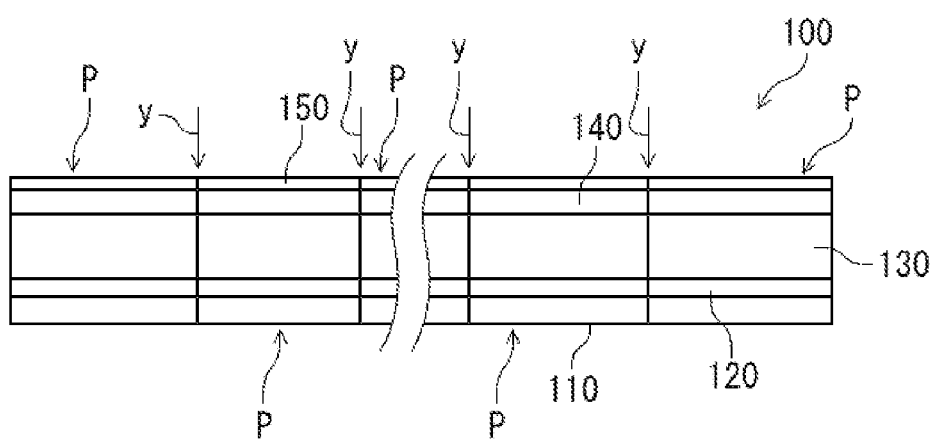
FIG. 14 is a side view illustrating the scrap member in FIG. 13, together with its thickness direction cutting lines.

As illustrated in FIG. 13 and FIG. 14, the scrap part 100 configured in this way is cut by a cutting machine (not illustrated) along a direction indicated by each of arrows y (see FIG. 14) in a lattice form (see FIG. 13), thereby to form a plurality of cut members which are the plurality of first mixed members P. With this configuration, the plurality of cut members which are the plurality of first mixed members P are formed by a plurality of cut main bodies respectively with the same rectangular parallelepiped shape and a plurality of fiber portions extending respectively from the plurality of cut main bodies.

Here, the above-mentioned cut main body forms the mixed main body Pa referred to in the first embodiment. Therefore, also in the fourth embodiment, the cut main body is referred to as the mixed main body Pa. The mixed main body Pa, which is the cut main body, has the same size as the mixed main body Pa referred to in the first embodiment.

Since the plurality of fiber portions referred to in the fourth embodiment correspond to the plurality of mixed fiber portions referred to in the first embodiment, the plurality of fiber portions are also referred to as the plurality of mixed fiber portions in the fourth embodiment.

In the scrap part 100, each nonwoven fabric forming the nonwoven fabric layers 110 and 150 are a collection of nonwoven fabric fibers. Thus, it is difficult to cut the plurality of nonwoven fabric fibers of each of the nonwoven fabric layers 110 and 150, when the scrap part 100 is cut into a lattice form as described above. Therefore, the plurality of mixed fiber portions referred to in the fourth embodiment are respectively formed to extend as a plurality of, for example, whisker fibers from each cut surface of the mixed main body Pa, which is the cut main body, as described above.

Furthermore, the plurality of glass fibers forming each of the glass fiber layers 120 and 140 have much higher rigidity and elasticity, compared with the nonwoven fabric layers 110 and 150. Therefore, when the scrap part 100 is cut into a lattice form as described above, the collection of each of the glass fibers of the glass fiber layers 120 and 140 are even more difficult to be cut, and extend like a whisker form from the mixed main bodies Pa (cut main bodies Pa) of the mixed members P, which are the cut members, as in the case of FIG. 7(a).

In the fourth embodiment, the plurality of second mixed members Q may be the plurality of second mixed members Q described in the first embodiment. The plurality of second mixed members Q referred to in the fourth embodiment may be a plurality of mixed members formed by crushing the other scrap part 100 by the above crusher, and then pulverizing the crushed materials by the above pulverizer. Other configurations are the same as those in the above first, second, or third embodiment.

According to the fourth embodiment configured as described above, also when, in the first mixed members P, the cut member described above is formed as the mixed main body Pa, and the plurality of fibers extending from the cut member are formed as the mixed fiber portions, the operations and effects that are the same as those described in the above first, second, or third embodiment may be achieved.

Additionally, for embodying the present invention, the following various modifications may be given without being limited to the above embodiments.

(1) The present invention may be also embodied by being applied to a hybrid motor vehicle having both an electric motor and an engine serving as prime movers, without being limited to the gasoline motor vehicle referred to in the first embodiment and the electric motor vehicle referred to in the second embodiment.

In this case, the floor silencer S which is capable of exhibiting excellent sound absorbing performance against both of the road noises and the battery noises may be disposed along the floor wall of the vehicle compartment of the hybrid motor vehicle.

(2) For embodying the present invention, the urethane U referred to in each of the above embodiments is not limited to the one described in the embodiments, and may be a binder of a thermosetting resin.

(3) For embodying the present invention, the scrap part referred to in each of the above embodiments is not limited to the configuration described in the first embodiment, and may be a layered composite member obtained by layering a porous layer, a thermosetting resin layer, and a glass fiber layer including a plurality of glass fibers.

(4) For embodying the present invention, the floor silencer is not limited to the floor silencer illustrated in FIG. 1 or FIG. 10, and may be the front silencer portion or the rear silencer portion of the floor silencer.

(5) For embodying the present invention, the present invention may be applied and embodied as various sound absorbers for motor vehicles or various floor silencers for motor vehicles.

What is claimed is:

1. A sound absorber for a motor vehicle formed in a predetermined layer shape, the sound absorber comprises:
a plurality of mixed members, and
a binder,
wherein said plurality of mixed members each include a mixed main body and a mixed glass fiber portion,
wherein said mixed main body is formed from a pulverized raw material having a steric shape, of a plurality of pulverized raw materials formed by pulverizing a layered composite raw material which is formed by layering a porous layer, a thermosetting resin layer, and a glass fiber layer, into various shapes including at least said steric shape and a linear shape,
wherein said steric shape of said pulverized raw material is a steric shape having a three-dimensional shape while retaining multi-layer composite structure and having a size within a range of 2 mm to 50 mm,
wherein said mixed glass fiber portion is formed from a plurality of glass fibers, said plurality of glass fibers being formed with said pulverization so as to extend from a portion of said pulverized raw material, having said steric shape, corresponding to said glass fiber layer of said layered composite raw material, and
wherein said mixed main body and said mixed glass fiber portion included in each of said plurality of mixed members are dispersedly stirred and mixed in said binder to form a stirred mixture body together with said binder,
said stirred mixture body has at least one labyrinthine path formed between a plurality of mixed main bodies, facing each other, of each mixed main body of said plurality of mixed members, and
said mixed glass fiber portion of each of said plurality of mixed members is located in said at least one labyrinthine path.

2. A sound absorber for a motor vehicle formed in a predetermined layer shape, the sound absorber comprises:
a plurality of mixed members, and
a binder,
wherein said plurality of mixed members each include a mixed main body and a mixed glass fiber portion,
wherein said mixed main body is formed from a pulverized raw material having a steric shape, of a plurality of pulverized raw materials formed by pulverizing a layered composite raw material which is formed by sequentially layering a one-side porous layer, a one-side glass fiber layer, a foamed urethane layer, an other-side glass fiber layer, and an other-side porous layer, into various shapes including at least said steric shape and a linear shape,
wherein said steric shape of said pulverized raw material is a steric shape having a three-dimensional shape while retaining multi-layer composite structure and having a size within a range of 2 mm to 50 mm,
wherein said mixed glass fiber portion is formed from a plurality of glass fibers, said plurality of glass fibers being formed with said pulverization so as to extend from a portion of said pulverized raw material, having said steric shape, corresponding to at least one glass fiber layer of said one-side glass fiber layer and said other-side glass fiber layer of said layered composite raw material, and wherein said mixed main body and said mixed glass fiber portion included in each of said plurality of mixed members are dispersedly stirred and mixed in said binder to form a stirred mixture body together with said binder, said stirred mixture body has at least one labyrinthine path formed between a plurality of mixed main bodies, facing each other, of each mixed main body of said plurality of mixed members, and said mixed glass fiber portion of each of said plurality of mixed members is located in said at least one labyrinthine path.

3. The sound absorber for a motor vehicle according to claim 1, wherein said layered composite raw material is cut at an interval in its thickness direction, thereby to be formed as a plurality of cut members, and wherein in each of said plurality of mixed members, said mixed main body is formed by any one of a plurality of said cut members having said steric shape, and said mixed glass fiber portion is formed from a plurality of glass fibers formed with said cutting so as to extend from a portion of said any one of plurality of cut members, having said steric shape, corresponding to said glass fiber layer of said layered composite raw material.

4. The sound absorber for a motor vehicle according to claim 2, wherein said layered composite raw material is cut at an interval in its thickness direction, thereby to be formed as a plurality of cut members, and wherein in each of said plurality of mixed members, said mixed main body is formed by any one of a plurality of said cut members having said steric shape, and said mixed glass fiber portion is formed from a plurality of glass fibers formed with said cutting so as to extend from a portion of said any one of plurality of cut members, having said steric shape, corresponding to at least one glass fiber layer of said one-side glass fiber layer and said other-side glass fiber layer of said layered composite raw material.

5. The sound absorber for a motor vehicle according to claim 1, further comprising a cotton fiber member in addition to said plurality of mixed members and said binder, wherein said stirred mixture body is formed by dispersedly stirring and mixing said plurality of mixed members and said cotton fiber member in said binder, and said cotton fiber member is located in said at least one labyrinthine path together with said mixed glass fiber portion of each of said plurality of mixed members, and wherein a mixture ratio A/B, where A represents said plurality of mixed members and B represents said cotton fiber member, is set to reduce noises respectively with a frequency in a predetermined frequency band, under cooperation with said at least one labyrinthine path and with said cotton fiber member and said mixed glass fiber portion of each of said plurality of mixed members in said at least one labyrinthine path.

6. The sound absorber for a motor vehicle according to claim 2, further comprising a cotton fiber member in addition to said plurality of mixed members and said binder, wherein said stirred mixture body is formed by dispersedly stirring and mixing said plurality of mixed members and said cotton fiber member in said binder, and said cotton fiber member is located in said at least one labyrinthine path together with said mixed glass fiber portion of each of said plurality of mixed members, and wherein a mixture ratio A/B, where A represents said plurality of mixed members and B represents said cotton fiber member, is set to reduce noises respectively with a frequency in a predetermined frequency band, under cooperation with said at least one labyrinthine path and with said cotton fiber member and said mixed glass fiber portion of each of said plurality of mixed members in said at least one labyrinthine path.

7. The sound absorber for a motor vehicle according to claim 5, wherein said predetermined frequency band shifts toward a low frequency band side or a high frequency band side, in accordance with an increase or decrease of the mixture ratio A/B.

8. The sound absorber for a motor vehicle according to claim 6, wherein said predetermined frequency band shifts toward a low frequency band side or a high frequency band side, in accordance with an increase or decrease of said mixture ratio A/B.

9. The sound absorber for a motor vehicle according to claim 1, wherein said layered composite raw material includes a layered composite part for scrapping installed already in a motor vehicle or a layered composite part for a motor vehicle subject to scrap due to poor quality.

10. The sound absorber for a motor vehicle according to claim 1, wherein with each of said plurality of mixed members as a first mixed member, a plurality of pulverized raw materials, respectively having said linear shape, of said plurality of pulverized raw materials are provided as a plurality of second mixed members, wherein said stirred mixture body is formed by dispersedly stirring and mixing said plurality of first mixed members and said plurality of second mixed members in said binder, and said plurality of second mixed members are located in said at least one labyrinthine path together with said mixed glass fiber portion of each of said plurality of first mixed members.

11. The sound absorber for a motor vehicle according to claim 2, wherein with each of said plurality of mixed members as a first mixed member, said plurality of pulverized raw materials, respectively having the linear shape, of said plurality of pulverized raw materials are provided as a plurality of second mixed members, wherein said stirred mixture body is formed by dispersedly stirring and mixing said plurality of first mixed members and said plurality of second mixed members in said binder, and said plurality of second mixed members are located in said at least one labyrinthine path together with said mixed glass fiber portion of each of said plurality of first mixed members.

12. The sound absorber for a motor vehicle according to claim 1, wherein said plurality of mixed main body each includes a mixed porous fiber portion, in addition to said mixed main body and said mixed glass fiber portion, wherein said mixed porous fiber portion is formed by a plurality of porous fibers, said plurality of porous fibers being formed with said pulverization so as to extend from a portion of said pulverized raw material, having said steric shape, corresponding to said porous fiber layer of said layered composite raw material, wherein said mixed porous fiber portion is formed by dispersedly being stirred and mixed together with said mixed main body and said mixed glass fiber portion of each of said plurality of mixed members to form said stirred mixture body together with said mixed main body and said mixed glass fiber portion of each of said plurality of mixed members, and said mixed porous fiber portion of each of said plurality of mixed members is located in said at least one labyrinthine path together with said glass fiber portion of each of said plurality of mixed members.

13. The sound absorber for a motor vehicle according to claim 11, wherein said plurality of first mixed main body each includes a mixed porous fiber portion, in addition to said mixed main body and said mixed glass fiber portion, wherein said mixed porous fiber portion is formed by a plurality of porous fibers, said plurality of porous fibers being formed with said pulverization so as to extend from a portion of said pulverized raw material, having said steric shape, corresponding to said porous fiber layer of said layered composite raw material, wherein said mixed porous fiber portion of each of said plurality of first mixed member is formed by dispersedly being stirred and mixed together with said mixed main body and said mixed glass fiber portion of each of said plurality of first mixed members to form said stirred mixture body together with said mixed main body and said mixed glass fiber portion of each of said plurality of first mixed members, and wherein said mixed porous fiber portion of each of said plurality of first mixed members is located in said at least one labyrinthine path together with said mixed glass fiber portion of each of said plurality of first mixed members and said plurality of second mixed members.

14. The sound absorber for a motor vehicle according to claim 1, wherein the larger a size of said mixed main body of each of said plurality of mixed members, the lower an air permeability of said mixed main body is set so as to reduce noises respectively with a frequency in a low-to-mid frequency band, and the smaller the size of said mixed main body, the higher the air permeability of said mixed main body is set so as to reduce noises respectively with a frequency in a high frequency band.

15. The sound absorber for a motor vehicle according to claim 11, wherein the larger a size of said mixed main body of each of said plurality of mixed members, the lower an air permeability of said mixed main body is set so as to reduce noises respectively with a frequency in a low-to-mid frequency band, and the smaller the size of said mixed main body, the higher the air permeability of said mixed main body is set so as to reduce noises respectively with a frequency in a high frequency band.

16. A floor silencer for a motor vehicle equipped with at either one of an electric motor and an engine as a prime mover, the floor silencer being formed in a predetermined layer shape and installed along a floor wall of a vehicle compartment of the motor vehicle from an inner side of the vehicle compartment, the floor silencer comprises:
a plurality of mixed members, and
a binder,
wherein said plurality of mixed members each include a mixed main body and a mixed glass fiber portion, wherein said mixed main body is formed from a pulverized raw material having a steric shape, of a plurality of pulverized raw materials formed by pulverizing a layered composite raw material which is formed by layering a porous layer, a thermosetting resin layer, and a glass fiber layer, into various shapes including at least said steric shape and a linear shape, wherein said steric shape of said pulverized raw material is a steric shape having a three-dimensional shape while retaining multi-layer composite structure and having a size within a range of 2 mm to 50 mm, wherein said mixed glass fiber portion is formed from a plurality of glass fibers, said plurality of glass fibers being formed with said pulverization so as to extend from a portion of said pulverized raw material, having said steric shape, corresponding to said glass fiber layer of said layered composite raw material, and wherein said mixed main body and said mixed glass fiber portion included in each of said plurality of mixed members are dispersedly stirred and mixed in said binder to form a stirred mixture body together with said binder, said stirred mixture body has at least one labyrinthine path formed between a plurality of mixed main bodies, facing each other, of each mixed main body of said plurality of mixed members, and said mixed glass fiber portion of each of said plurality of mixed members is located in said at least one labyrinthine path.

17. The floor silencer for a motor vehicle according to claim 16, further comprising a cotton fiber member in addition to said plurality of mixed members and said binder, wherein said stirred mixture body is formed by dispersedly stirring and mixing said plurality of mixed members and said cotton fiber member in said binder, and wherein said cotton like fiber member is located in said at least one labyrinthine path together with said mixed glass fiber portion of each of said plurality of mixed members.

18. The floor silencer for a motor vehicle according to claim 16, wherein with each of said plurality of mixed members as a first mixed member, a plurality of pulverized raw materials, respectively having said linear shape, of said plurality of pulverized raw materials are provided, as a plurality of second mixed members, wherein said stirred mixture body is formed by dispersedly stirring and mixing said plurality of first mixed members and said plurality of second mixed members in said binder, and said plurality of second mixed members are located in said at least one labyrinthine path together with said mixed glass fiber portion of each of said plurality of first mixed members.

19. The floor silencer for a motor vehicle according to claim 17, wherein in said mixed main body of each of said plurality of mixed members, with said porous layer and said glass fiber layer respectively as a one-side porous layer and a one-side glass fiber layer, said layered composite raw material is formed by sequentially layering said one-side porous layer, said one-side glass fiber layer, said thermosetting resin layer, an other-side glass fiber, and an other-side porous layer, wherein said mixed glass fiber portion is formed from a plurality of glass fibers formed with said pulverization so as to extend from a portion of said pulverized raw material, having said steric shape, corresponding to at least one glass fiber layer of said one-side glass fiber layer and said other-side glass fiber layer of said layered composite raw material, and wherein a mixture ratio A/B, where A represents said plurality of mixed members and B represents said cotton fiber member, is set to reduce noises respectively with a frequency in a predetermined frequency band, under cooperation with said at least one labyrinthine path and with said cotton fiber member and said mixed glass fiber portion of each of said plurality of mixed members in said at least one labyrinthine path.

20. The sound absorber for a motor vehicle according to claim 18, wherein said plurality of first mixed main body each includes a mixed porous fiber portion, in addition to said mixed main body and said mixed glass fiber portion, wherein said mixed porous fiber portion is formed by a plurality of porous fibers, said plurality of porous fibers being formed with said pulverization so as to extend from a portion of said pulverized raw material, having said steric shape, corresponding to said porous fiber layer of said layered composite raw material, wherein said mixed porous fiber portion of each of said plurality of first mixed member is formed by dispersedly being stirred and mixed together with said mixed main body and said mixed glass fiber portion of each of said plurality of first mixed members to form said stirred mixture body together with said mixed main body and said mixed glass fiber portion of each of said plurality of first mixed members, and wherein said mixed porous fiber portion of each of said plurality of first mixed members is located in said at least one labyrinthine path together with said mixed glass fiber portion of each of said plurality of first mixed members and said plurality of second mixed members.

21. The sound absorber for a motor vehicle according to claim 16, wherein the larger a size of said mixed main body of each of said plurality of mixed members, the lower an air permeability of said mixed main body is set so as to reduce noises respectively with a frequency in a low-to-mid frequency band, and the smaller the size of said mixed main body, the higher the air permeability of said mixed main body is set so as to reduce noises respectively with a frequency in a high frequency band.

22. The floor silencer for a motor vehicle equipped with said engine of said electric motor and said engine provided as said prime mover according to claim 16, wherein said mixed main body of each of said plurality of mixed members is set at its size to reduce noises respectively with a frequency in a low-to-mid frequency range.

23. The floor silencer for a motor vehicle according to claim 16, the motor vehicle being equipped with said electric motor of said electric motor and said engine as said prime mover, and also with a battery set disposed along a lower surface of said floor wall and including a battery group supplying electric power to said prime mover, wherein said mixed main body of each of said plurality of mixed members is set at its size to reduce noises respectively with a frequency in a low-to-mid frequency range and a high frequency range.

* * * * *